United States Patent
Egashira et al.

(10) Patent No.: US 7,508,878 B2
(45) Date of Patent: Mar. 24, 2009

(54) WIRELESS COMMUNICATION APPARATUS

(75) Inventors: Yoshimasa Egashira, Kawasaki (JP);
Daisuke Takeda, Kawasaki (JP);
Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 639 days.

(21) Appl. No.: 11/167,302

(22) Filed: Jun. 28, 2005

(65) Prior Publication Data
US 2005/0286651 A1  Dec. 29, 2005

(30) Foreign Application Priority Data
Jun. 29, 2004  (JP)  ............................... 2004-192079

(51) Int. Cl.
*H04B 7/02* (2006.01)
(52) U.S. Cl. .................. 375/267; 375/299; 375/347
(58) Field of Classification Search ............... 375/267, 375/260, 299, 347; 455/101, 132
See application file for complete search history.

(56) References Cited

U.S. PATENT DOCUMENTS

| | | | | |
|---|---|---|---|---|
| 7,200,178 B2 * | 4/2007 | Shoemake et al. | .......... | 375/260 |
| 2003/0124995 A1 * | 7/2003 | Tanaka | ...................... | 455/101 |
| 2003/0210646 A1 * | 11/2003 | Ohseki et al. | ................ | 370/203 |
| 2004/0153679 A1 * | 8/2004 | Fitton et al. | .................. | 713/322 |
| 2004/0157644 A1 * | 8/2004 | Aytur et al. | .............. | 455/562.1 |
| 2004/0208253 A1 * | 10/2004 | Joo | ............................ | 375/260 |
| 2004/0233838 A1 | 11/2004 | Sudo et al. | | |
| 2005/0152473 A1 * | 7/2005 | Maltsev et al. | .............. | 375/299 |
| 2005/0233709 A1 * | 10/2005 | Gardner et al. | ............. | 455/101 |
| 2006/0058061 A1 * | 3/2006 | Nakagawa et al. | ........ | 455/553.1 |
| 2006/0166626 A1 * | 7/2006 | Luo et al. | ...................... | 455/69 |

OTHER PUBLICATIONS

Jan Boer, et al., "Backwards Compatibility: How to make a MIMO-OFDM system backwards compatible and coexistence with 11a/g at the link level", IEEE 802.11-03/714r0, Sep. 2003, 26 Pages.

* cited by examiner

*Primary Examiner*—David C Payne
*Assistant Examiner*—Leon-Viet Q Nguyen
(74) *Attorney, Agent, or Firm*—Oblon, Spivak, McClelland, Maier & Neustadt, P.C.

(57) ABSTRACT

A wireless communication apparatus having a plurality of antennas for transmitting a known symbol by using a plurality of subcarriers to a receiver, the known symbol including known information, the apparatus includes each of the subcarriers which carries the known information being classified into at least two groups, and a phase control unit configure to control inversion/non-inversion of a phase of the known information carried on two subcarriers which belong to the same group in accordance with notification information to be notified to the receiver.

13 Claims, 15 Drawing Sheets

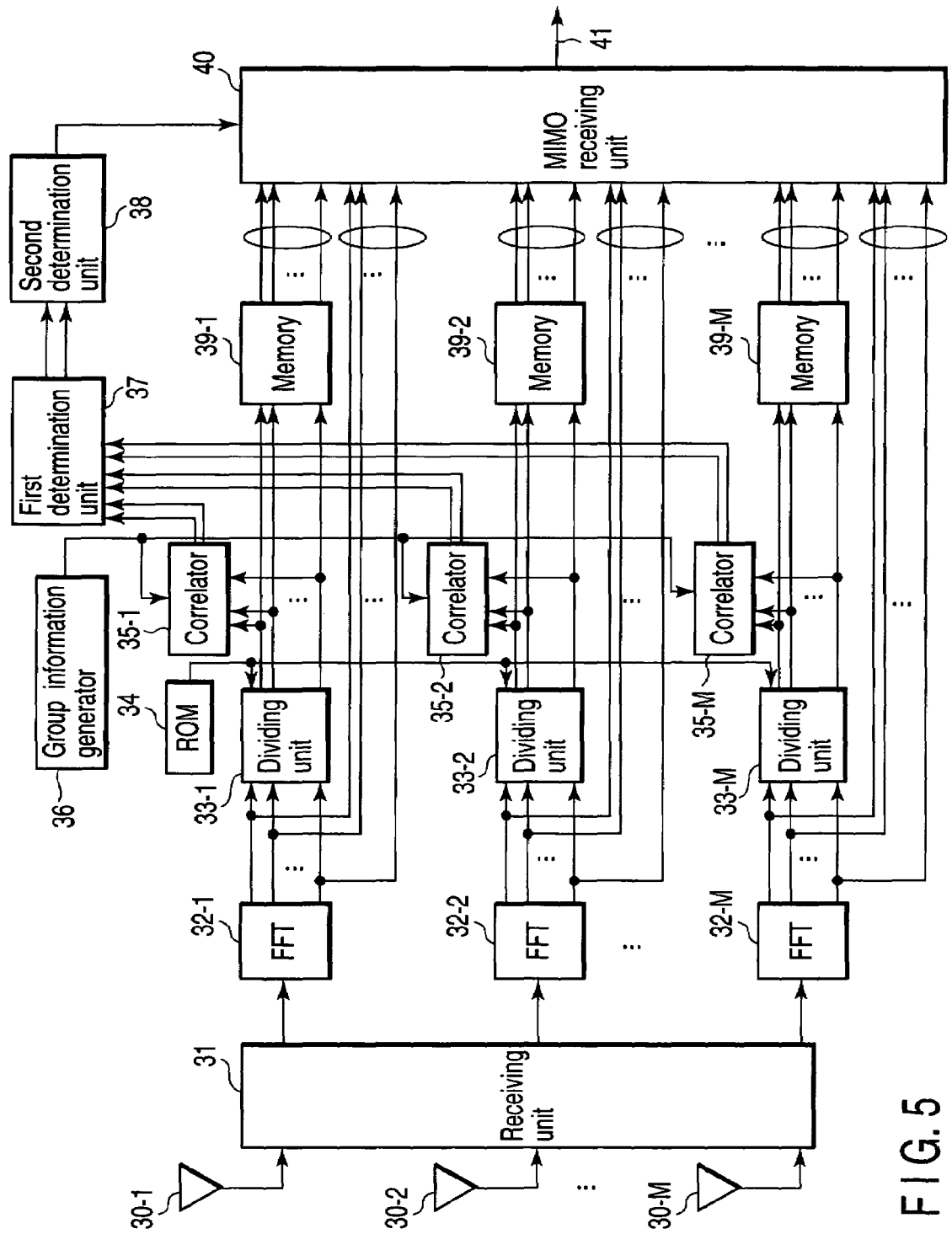
F I G. 5

| Sub-carrier number | 0 | 1 | 2 | ... | N-2 | N-1 |
|---|---|---|---|---|---|---|
| Group number | G(0) | G(1) | G(2) | ... | G(N-2) | G(N-1) |

FIG. 7

| Combination of correlation values of group 1 and group 2 | (positive, positive) | (negative, positive) | (positive, negative) | (negative, negative) |
|---|---|---|---|---|
| The number of transmitting antennas | 1 | 2 | 3 | Not available |

FIG. 8

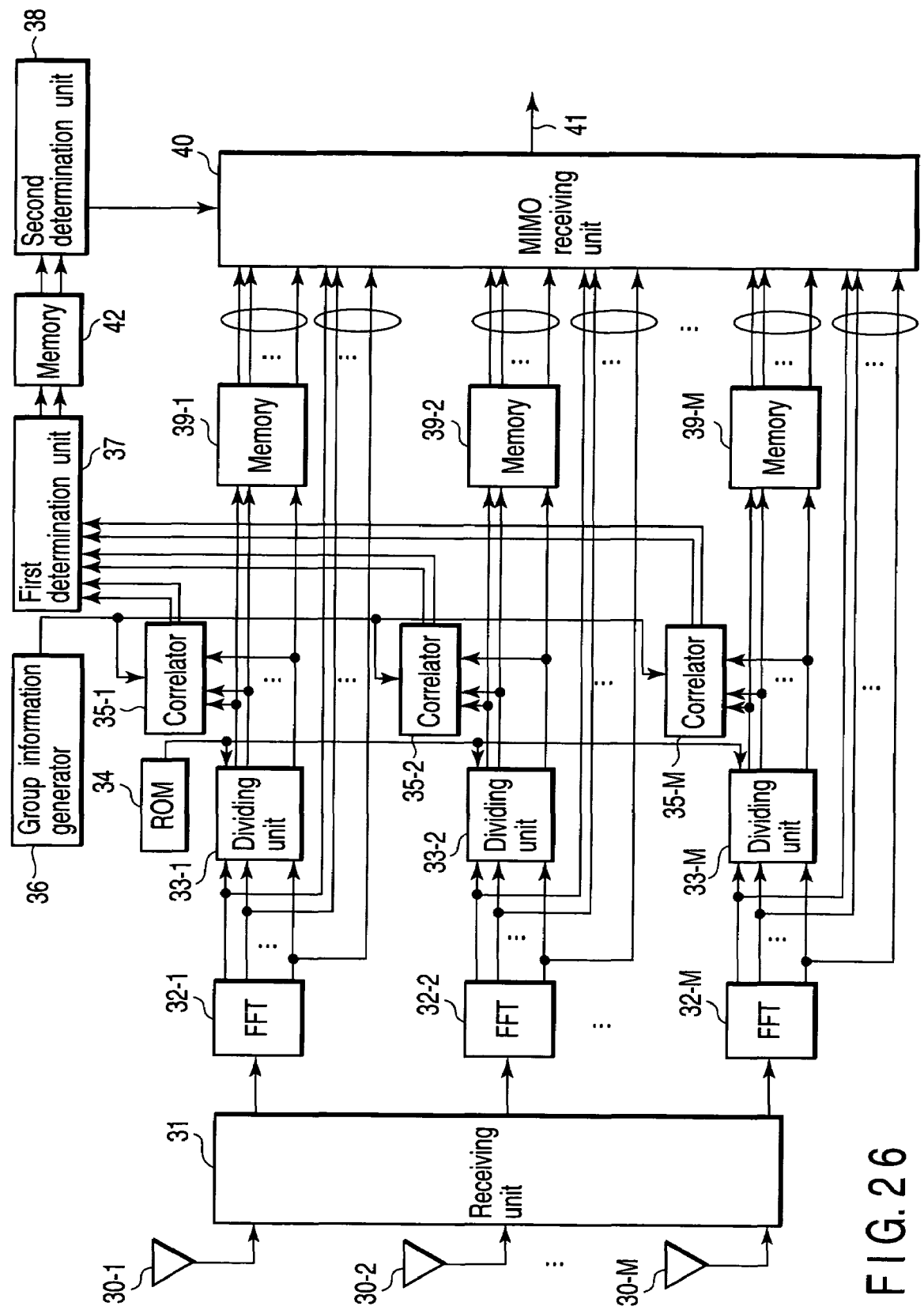
F I G. 26

| (Zj,1, Zj,2, Zj,2, 1, Zj,2, 2) | (positive, positive, positive,positive) | (negative, positive, positive, positive) | (negative, positive, negative, positive) | (positive, positive, negative, positive) | (positive, negative, negative, positive) | Others |
|---|---|---|---|---|---|---|
| The number of transmitting antennas | 1 | 2 | 3 | 4 | 5 | Not available |

Zj,k : Correlation value after determination of the k-th group in the i-th known symbol

WIRELESS COMMUNICATION APPARATUS

CROSS-REFERENCE TO RELATED APPLICATIONS

This application is based upon and claims the benefit of priority from prior Japanese Patent Application No. 2004-192079, filed Jun. 29, 2004, the entire contents of which are incorporated herein by reference.

BACKGROUND OF THE INVENTION

1. Field of the Invention

The present invention relates to Multi-Input Multi-Output Orthogonal Frequency Division Multiplexing (MIMO-OFDM) for communication using a plurality of antennas and a plurality of subcarriers, and also relates to the technique of a high-speed wireless LAN.

2. Description of the Related Art

A conventional wireless LAN (IEEE 802.11a) transmits known symbols (short preamble, long preamble) in advance of a data signal so as to perform synchronous processing and channel estimation and can demodulate a data part by using these preambles. MIMO is known as a technique to improve a transmission speed without expanding a frequency band width. Since a transmitting/receiving device in MIMO uses a plurality of antennas, MIMO has to change a structure of the short preamble and the long preamble in order to apply MIMO to the conventional wireless LAN.

According to a preamble structure idea proposed in a document 1 (Jan Boer, et al. two "Backwards compatibility", September, 2003, IEEE LMSC, the Internet <URL:ftp://ieee:wireless@ftp,802wirelessworld.com/11/03/11-03-0714-00-000n-backwards-compatibility.ppt>), at first, a short preamble sequence used for time synchronization, frequency synchronization and automatic gain control (AGC) is transmitted, a long preamble including symbols for channel response estimation and a signal field are transmitted from one transmitting antenna. Then, the long preambles for the channel response estimation are transmitted in order. Thus, data is simultaneously transmitted from a plurality of transmitting antennas after transmitting the preamble signals. That is, the long preambles for the channel response estimation are transmitted by using the plurality of transmitting antennas through time division multiplexing.

By the way, in a MIMO system, a receiver has to acquire information about the number of transmitting antennas, a modulation method, an encoding rate, etc. so as to demodulate a received signal. For the purpose of acquiring the information on the receiver, a system for transmitting a dedicated signal to inform the information is taken into consideration. But the system has problems of increase in overhead and deterioration in throughput. In the case such that information needed for demodulation is estimated from the received signal, the demodulation becomes impossible if the estimation is resulted in failure, so that the estimation requires high accuracy. A system for estimating the information using the received preamble signals is assumable, however, the preamble signals as described in the document 1 is not premised on the estimation of the information, so that it is hard to accurately estimate the information by using the preamble signals.

In the MIMO system as just mentioned, in the case of the estimation of the information (such as the number of the transmitting antennas, etc.)necessary for the demodulation from the received signal, there is a problem such that the MIMO system can not easily estimate the number of the transmitting antennas with high accuracy, etc. by using the preamble signals in the document 1, because the estimation requires accuracy higher than that of for demodulation of data. And, the system in the document 1 for transmitting the information necessary for the demodulation involves the problem such as the increase in overhead.

Therefore, an object of the invention is to easily estimate the notification item necessary for demodulating data symbols on the receiver and correctly demodulate the data symbols without having to add the dedicated signal to inform the notification item.

BRIEF SUMMARY OF THE INVENTION

According to embodiments of the present invention, a wireless communication apparatus includes a plurality of antennas for transmitting a known symbol by using a plurality of subcarriers to a receiver, the known symbol including known information; each of the subcarriers which carries the known information being classified into at least two groups; and a phase control unit configure to control inversion/non-inversion of a phase of the known information carried on two subcarriers which belong to the same group in accordance with notification information to be notified to the receiver.

According to embodiments of the present invention, a wireless communication apparatus receives a known symbol by using a plurality of subcarriers, the known symbol including known information, the known information being classified into at least two groups and being controlled by a phase control unit configure to control inversion/non-inversion of a phase of the known information carried on two subcarriers which belong to the same group in accordance with notification information to be notified, calculates each of channel response corresponding to each of the subcarriers from the received known symbol; calculates a correlation value between two channel response corresponding to the two subcarriers which belong to the same group to obtain correlation value corresponding to each of the group, and estimates the notification information based on the correlation value.

BRIEF DESCRIPTION OF THE SEVERAL VIEWS OF THE DRAWING

FIG. 5 is a block diagram showing the arrangement of a wireless communication apparatus (a receiver) according to the first embodiment;

FIG. 7 is a view showing an example of a table showing group information on subcarriers, which is stored in a group information generator;

FIG. 8 is a view showing an example of a reference table showing a combination of correlation values and the number of transmitting antennas, which is stored in a second determination unit;

FIG. 26 is a block diagram showing the arrangement of a wireless communication apparatus (a receiver) according to the sixth embodiment;

FIG. 27 is a view showing another example of a reference table showing a combination of correlation values and the number of transmitting antennas, which is stored in a second determination unit;

DETAILED DESCRIPTION OF THE INVENTION

Embodiments of the present invention will be described below with reference to the accompanying drawing.

First Embodiment

Figure 1:
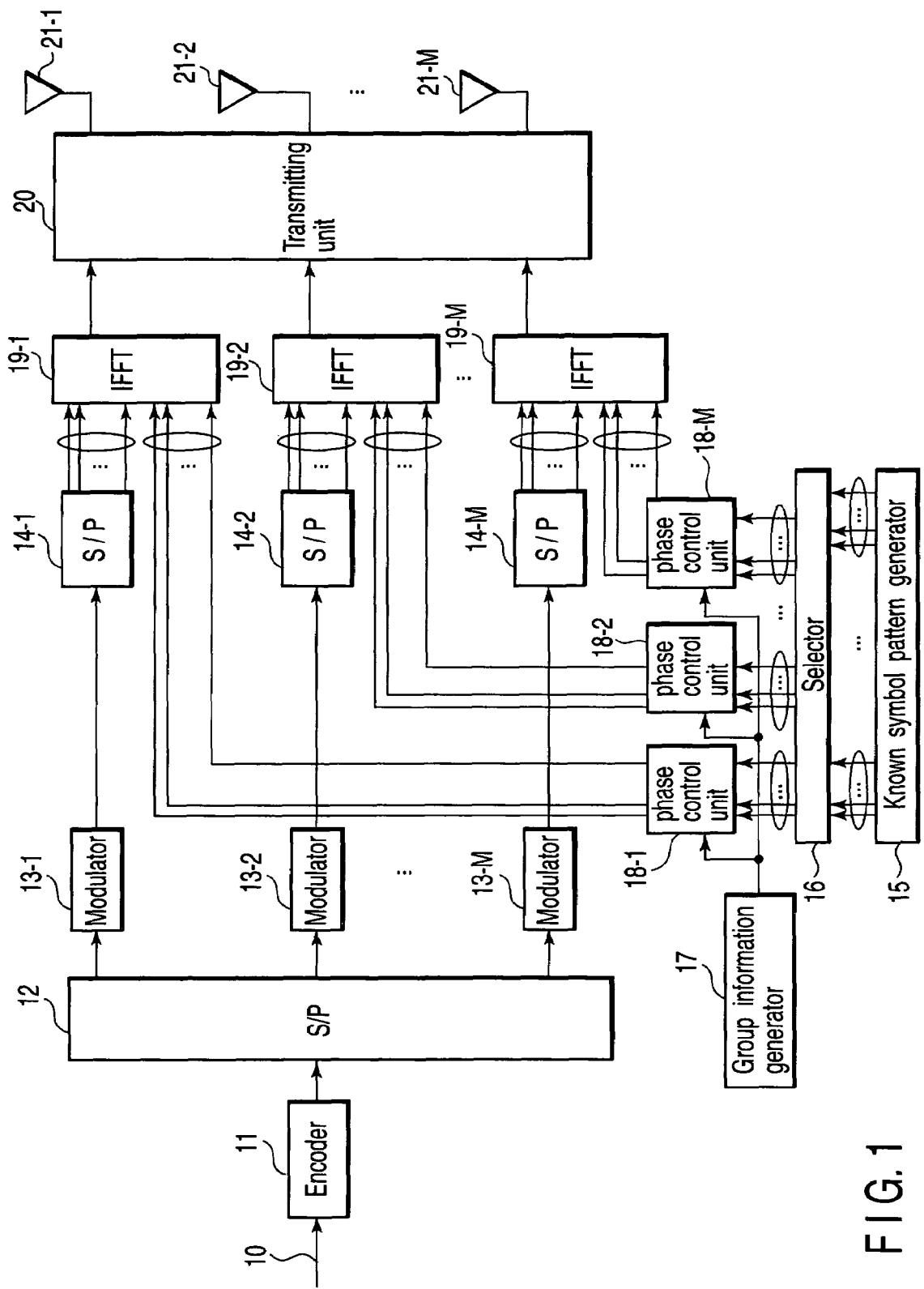
FIG. 1 is a block diagram showing the arrangement of a wireless communication apparatus (a transmitter) according to the first embodiment.

A wireless communication apparatus (a transmitter) according to a first embodiment will be explained referring to FIG. 1. FIG. 1 shows a physical layer of the transmitter. Data (bit sequence) 10 to be transmitted input to the physical layer at every transmission unit (for example, frame or packet) from an upper layer. An encoder 11 performs, e.g., error correction coding on the input data 10, and generates a coded bit sequence. A serial-to-parallel (S/P) converter 12 divides the coded bit sequence into a plurality of streams by serial-to-parallel conversion.

Modulators 13-1 to 13-M map these streams on a complex plane to generate modulated data symbols.

Serial-to-parallel (S/P) converters 14-1 to 14-M perform serial-to-parallel conversion on the modulated data symbols so that they are transmitted on subcarriers of orthogonal frequency-division multiplexing (OFDM). In addition, inverse fast Fourier transform (IFFT) units 19-1 to 19-M transform these signals on the frequency domain into waveforms in the time domain. The waveforms in the time domain output from the IFFT units 19-1 to 19-M are input to a transmitting unit 20.

In the transmitting unit 20, a guard interval (GI) is added to the signals output from the IFFT units 19-1 to 1-M, and the signals obtained are converted into analog signals by a D/A converter. The signals output from the D/A converter are converted (up-converted) into an RF (Radio-Frequency) band by a frequency converter, and supplied to transmitting antennas 20-1 to 20-M via a power amplifier. The OFDM signals are transmitted from the transmitting antennas 20-1 to 20-M to a wireless communication apparatus of a communication partner.

Preambles are transmitted before the data symbols are thus transmitted as the OFDM signals. A transmission system of known symbols, which are preambles for estimating channel will be explained below.

A known symbol pattern generator 15 is, e.g., a ROM, and stores a plurality of known symbol patterns. Each known symbol is transmitted by carrying its information on some of a plurality of OFDM subcarriers. A known symbol pattern indicates a subcarrier arrangements on which plural known information of a known symbol are carried. In the example shown in FIG. 1, the ROM stores known symbol patterns on the frequency domain.

When a known symbol is to be transmitted, a plurality of known symbol patterns stored in the ROM of the known symbol pattern generator 15 are sequentially read out at the transmission timing of the known symbol, and input to a selector 16. The selector 16 assigns each known information of the known symbol read out from the ROM of the symbol generator 15 to phase control units 18-1 to 18-M corresponding to antennas in accordance with transmission timing of the known symbol so as to transmit each known information from appropriate transmitting antennas.

In the case that the there are a plurality of kinds of known symbols such as short preambles and long preambles included in preambles of a wireless LAN, the selector 16 switches ROMs to read out the kinds of known symbols.

A group information generator 17 stores each group information as to each group of subcarriers input to each of the phase control units 18-1 to 18-M and outputs each group information to each of the phase control units 18-1 to 18-M. The group information stored in the group information generator 17 will be explained later.

Inversion/non-inversion of phase of each known information carried on each subcarrier input to the phase control units 18-1 to 18-M are controlled according to the group of subcarriers to which each subcarrier belong and notification item which is information to be notified to a receiver, such as the number of antennas used for transmission in the first embodiment, by using the known symbols. The each known symbol subjected to phase control is input to the IFFT units 19-1 to 19-M. Then, the output signals from the IFFT units 19-1 to 19-M are introduced into the transmitting unit 20.

The information generator 17 previously stores a table shown in FIG. 7. The table includes group information showing the group that each subcarrier output from the selector 16 belonged to. G (N) in FIG. 7 is a group number of the N-th subcarrier and becomes to one among 1 to Ng if the total number of the groups is Ng. The total number Ng of the groups is calculated based on the number of patterns Np of notification items (the number of transmitting antennas in the first embodiment) to be notified to the receiver, using the following formula (1):

$$Ng-1 < \log 2(Np) \leq Ng \quad (1)$$

For example, two groups are enough due to formula (1), in the case of four patterns [1], [2], [3] and [4] are notified to the receiver or in the case of three patterns [1], [2] and [3] are notified to the receiver as the number of the transmitting antennas.

the receiver mentioned below estimates the number of the transmitting antennas while obtaining channel estimation value corresponding to each subcarrier at the time of reception of the known symbols simultaneously transmitted from each transmitting antenna.

Figure 2:
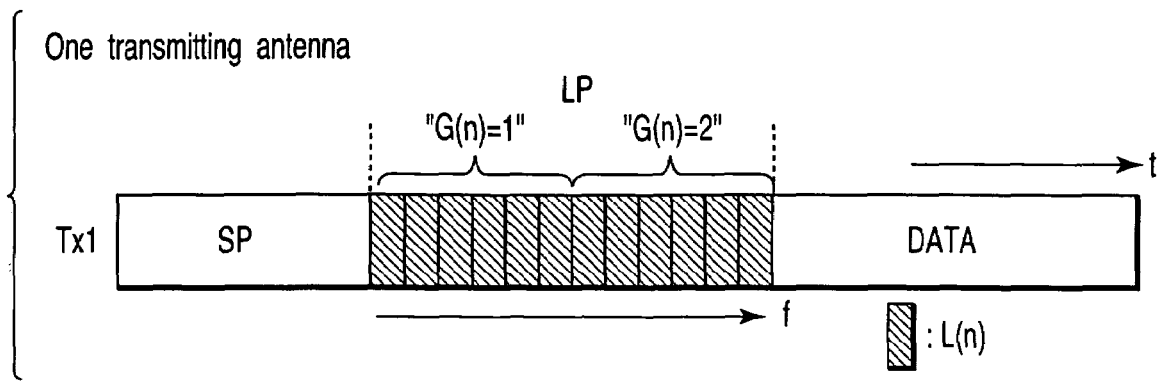
FIG. 2 is a view for explaining a known symbol (for channel estimation) transmission method, when there is one transmitting antenna, according to the first embodiment.
Figure 3:
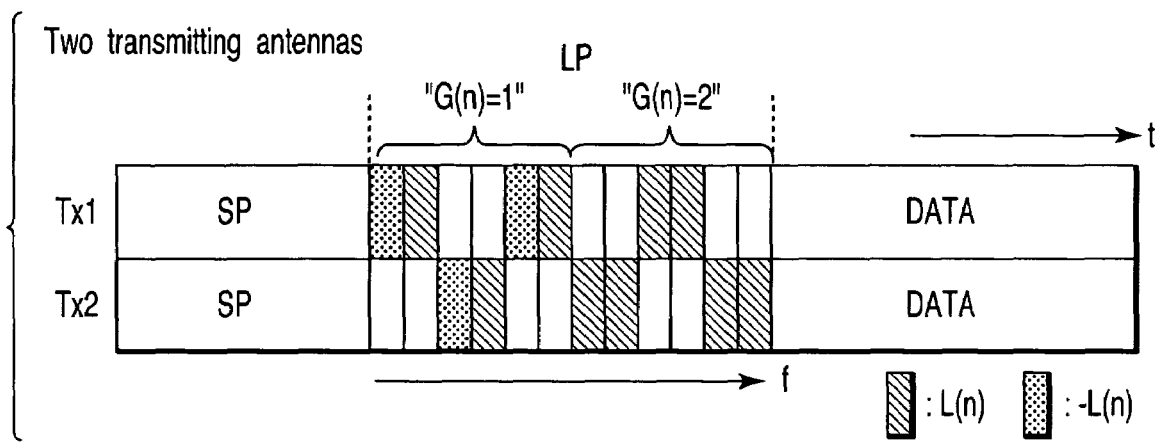
FIG. 3 is a view for explaining a known symbol (for channel estimation) transmission method, when there is two transmitting antennas, according to the first embodiment.
Figure 4:
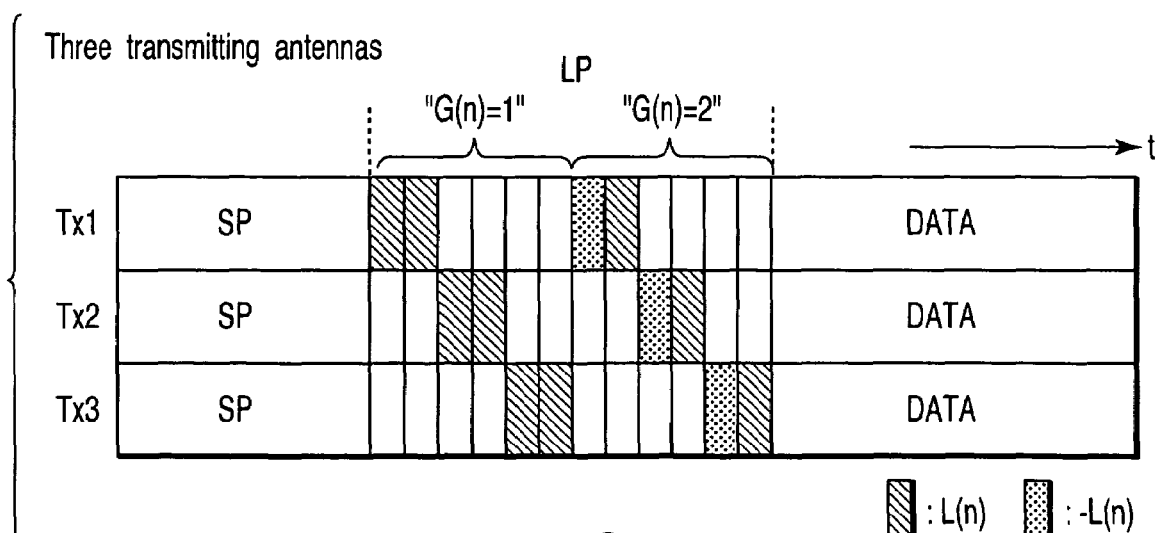
FIG. 4 is a view for explaining a known symbol (for channel estimation) transmission method, when there is three transmitting antennas, according to the first embodiment.

An example of a method of transmitting known symbols for channel estimation will be explained in detail below with reference to FIGS. 2 to 4. FIGS. 2 to 4 illustrate the structures of radio frames containing preambles when there are, respectively, one (Tx1), two (Tx1, Tx2), and three (Tx1, Tx2, Tx3) transmitting antennas which simultaneously transmit known symbols. In the first embodiment, since the maximum number of the transmitting antennas is three, the total number Ng of the group becomes two in accordance with the formula (1).

The first embodiment assumes a system such as a wireless LAN which transmits a short preamble SP for synchronization and a long preamble LP for channel estimation before a data field (DATA). The arrangement of the short preamble SP is not particularly limited. For example, a short preamble similar to the IEEE 802.11a can be transmitted from a plurality of transmitting antennas. A known symbol is used to estimate a channel response in MIMO communication. In a wireless LAN, a known symbol corresponds to the long preamble LP shown in FIGS. 2 to 4.

Referring to FIGS. 2 to 4, frequency-division multiplexing is applied on the long preamble LP transmitted from each transmitting antenna. Letting M be the number of transmitting antennas and N be the number of OFDM subcarriers, assume that N can be divided by 2M without a remainder. In this case, known information of a known symbol exists in subcarriers represented by expressions (2) and (3) below (the numbers of the N subcarriers are defined as 0th to (N−1)th), and does not exit in any other subcarrier.

$$2(Ml+m+1) \bmod N \quad (2)$$

$$[2(Ml+m-1)+1] \bmod N \quad (3)$$

where m=1, 2, . . . , M are the antenna numbers, and l=0, 1, . . . , (N/2M−1).

The group number to which the n-th subcarrier belongs is represented by expressions (4) and (5) below.

$$G(n)=1, \text{ (where, } n<N/2) \quad (4)$$

$$G(n)=2, \text{ (where, } n \geq N/2) \quad (5)$$

In addition, as shown in FIG. 2, letting L1(n) be an information value of a known symbol carried on the nth subcarrier when there is one antenna, an information value LM(n) of the known symbol carried on the nth subcarrier of the mth antenna when there are M ($\geq 2$) antennas is given by expressions (6) and (7) below.

If M=2, G(n)=1, and n is an even number $$LM(n)=-L1(n) \quad (6)$$

If M=3, G(n)=2, and n is an even number $$LM(n)=-L1(n) \quad (7)$$

If M, G(n), and n are other than described above $$LM(n)=L1(n) \quad (8)$$

For example, in the case of FIG. 2 (M=1: one antenna), the combination of the numbers of subcarriers, in which known information of one known symbol transmitted from antenna 1 (Tx1) exists, group numbers of the subcarriers, and information values carried on these subcarriers are as follows.

The known symbols of antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

the case of FIG. 3 (M=2: two antennas), on the basis of expressions (2)-(8), the combinations of the numbers of subcarriers, in which known information of one known symbol transmitted from antenna 1 (Tx1) and antenna 2 (Tx2) exists, group numbers of the subcarriers, and information values carried on these subcarriers are as follows.

The known symbols of the antenna 1: subcarrier numbers (0, 1, 4, 5, 8, 9), group numbers (1, 1, 1, 1, 2, 2), information values [−L1 (0), L1 (1), −L1 (4), L1 (5), L1 (8), L1 (9)].

The known symbols of the antenna 2: subcarrier numbers (2, 3, 6, 7, 10, 11), group numbers (1, 1, 2, 2, 2, 2), information values [−L1 (2), L1 (3), L1 (6), L1 (7), L1 (10), L1 (11)].

the case of FIG. 4 (M=3: three antennas), on the basis of expressions (2)-(8), the combinations of the numbers of subcarriers, in which known information of one known symbol transmitted from antenna 1 (Tx1), antenna 2 (Tx2) and antenna 3 (Tx3) exists, group numbers of the subcarriers, and information values carried on these subcarriers are as follows.

The known symbols of the antenna 1: subcarrier numbers (0, 1, 6, 7), group numbers (1, 1, 2, 2), information values [L1 (0), L1 (1), −L1 (6), L1 (7)].

The known symbols of the antenna 2: subcarrier numbers (2, 3, 8, 9), group numbers (1, 1, 2, 2), information values [L1 (2), L1 (3), −L1 (8), L1 (9)].

The known symbols of the antenna 3: subcarrier numbers (4, 5, 10, 11), group numbers (1, 1, 2, 2), information values [L1 (4), L1 (5), −L1 (10), L1 (11)].

Note that in FIGS. 2 to 4, the preamble structure is represented with time. However, for the sake of convenience, subcarriers on which information of the long preamble LP exists are represented by oblique lines and dots. Also, subcarriers indicated by dots in FIGS. 2 to 4 represent subcarriers into which known information whose phase is inverted by expression (6) (7) is inserted. The upper sections of each subcarrier, in FIGS. 2 to 4, indicate the group number to which the each subcarrier belongs.

As shown in FIGS. 2 to 4, in the known symbols with regard to the first embodiment, inversion/non-inversion of phase of known information on one of two adjacent subcarriers is controlled at every group to which the two adjacent subcarriers belong, in accordance with notification item (for example, the number of the transmitting antennas) to be notified to the receiver.

With acquiring of the number of groups in accordance with formula (1), the patterns showing each group to be the group in which either of two adjacent subcarriers should be inverted in its phase or the group in which both of two adjacent subcarriers should not be inverted in their phase can be acquired as many as the number of notification items to be notified to the receiver. Each pattern is preliminarily associated with the notification item to be notified to the receiver. That is, the pattern shown in FIG. 2 corresponds to the notification item that there is one transmitting antenna, the patterns shown in FIG. 3 corresponds to the notification item that there are two transmitting antennas, and the patterns shown in FIG. 4 correspond to is notification item that there are three transmitting antennas.

On the transmitter, the selector 16 reads one of the known symbol patterns from the known symbol pattern generator (ROM) 15. each of the known symbol patterns shows assignment of the known information of the known symbol to the subcarriers and shows each subcarrier on which each known information of the known symbol is carried. The selector 16 assigns each of the known information to the phase control units 18-1 to 18-M corresponding to each antenna 21-1 to 21-M so as to transmit each of the known information from each appropriate antenna, respectively.

The phase control units 18-1 to 18-M are configured to control the inversion/non-inversion of the two adjacent subcarriers of each group using patterns corresponding to notification item which is used for demodulation of data symbols and notified to the receiver. The phase control units 18-1 to 18-M invert phases of one of the two adjacent subcarriers that belong to a group in which either of two adjacent subcarriers should be inverted in its phase, and do not invert both of two adjacent subcarriers that belong to a group in which both of two adjacent subcarriers should not be inverted in their phase.

FIG. 2-FIG. 4 show the examples in the cases that the maximum number Mmax of the transmitting antennas is three, however, they can expandable in the cases that the number Mmax is four. In this cases, since there should be Mmax pieces of patterns corresponding to the number of antennas Mmax, Ng (the number of groups) is obtained from the formula (1) with Np=Mmax substituted therein. And subcarriers are classified into one of the Ng groups, inverse/non-inverse of phases of the adjacent two subcarriers in the known symbols are controlled at every group in accordance with the number of antennas.

FIG. 2-FIG. 4 show the examples in the cases that the notification item to be notified on the receiver is the number of the transmitting antennas, however, the notification item to be notified is not limited to the number of the antennas, notification item such as a modulation method for modulating a data field, an encoding method, a coding rate, the number of symbols, the number of information bits and a combination thereof is acceptable. In these cases, Ng (the number of groups) is obtained from the formula (1) in accordance with the number of patterns corresponding to the number of notification items (information) to be notified on the receiver. And subcarriers are classified into one of the Ng groups, inverse/non-inverse of phases of the two adjacent subcarriers in the known symbols are controlled in accordance with the group to which the two adjacent subcarriers belong and the number of antennas.

The receiver according to the first embodiment of the present invention will be described below with reference to FIG. 5. Referring to FIG. 5, the OFDM signals of the RF band transmitted from the transmitter shown in FIG. 1 are received by a plurality of receiving antennas 30-1 to 30-M. OFDM received signals from the receiving antennas 30-1 to 30-M are input to a receiving unit 31.

In the receiving unit 31, the input OFDM signals from the receiving antennas 30-1 to 30-M are amplified by a low-noise amplifier (LNA), and converted (down-converted) into a base band by a frequency converter. In addition, these frequency-converted signals are converted into digital signals by an analog-to digital (A/D) converter, and the guard interval (GI) is removed from the digital signals.

The output signals from the receiving unit 31 are input to fast Fourier transform (FFT) units 32-1 to 32-M where these waveform signals in the time domain are transformed into waveform signals in the frequency domain, i.e., into the waveforms of individual subcarriers. Of the output signals from the FFT units 32-1 to 32-M, signals of data symbol sections are input to an MIMO signal processing unit 40.

On the other hand, of the output signals from the FFT units 32-1 to 32-M, signals of preambles, particularly, known symbol sections are input to dividing units 33-1 to 33-M. The waveforms of the individual subcarriers input to these dividing units are divided by a known symbol pattern stored in a ROM 34, and thereby converted into estimation values of the channel characteristics. These estimation values are stored in memories 39-1 to 39-M and input to correlators 35-1 to 35-M. The known information pattern stored in the ROM 34 is the same as in the case of FIG. 2 (when one antenna (M=1)).

The correlators 35-1 to 35-M calculate each correlation value corresponding to each group by using the channel characteristic estimation values, based on group information of subcarriers from a group information generator 36, and input the correlation value to a first determination unit 37. The group information generator 36 is composed similarly to that of the group information generator 17 in FIG. 1 and outputs the group information corresponding to each subcarrier to the correlation units 35-1 to 35-M.

The first determination unit 37 determines whether the input correlation values are positive or negative at every group and outputs the determination result to a second determination unit 38. The second determination unit 38 determines the number of the transmitting antennas, based on combinations of the correlation values of each group, and outputs the number of the transmitting antennas to the MIMO receiving unit 40. The details of an algorithm of estimation of the number of the transmitting antennas will be described later.

The MIMO receiving unit 40 performs an MIMO signal receiving process, e.g., maximum likelihood estimation, on the data symbol section signals from the FFT units 32-1 to 32-M in accordance with the channel estimation values from the memories 39-1 to 39-M, and the estimation value of the number of transmitting antennas from the second determination unit 38. Channel decoding is performed on the signals having undergone this MIMO signal receiving process, thereby reconstructing transmitted data 41.

Assume that the nth subcarrier signal of the known symbol received by the jth receiving antenna is Xj(n). An estimation value (an output signal from a dividing unit) Aj(n) of the channel characteristic of this subcarrier is given by $$Aj(n)=Xj(n)/L1(n) \quad (9)$$

Letting hj(n) be the actual channel characteristic value of this subcarrier, and Nj(n) be the noise signal, Xj(n) can be expressed by $$Xj(n)=hj(n)\cdot LM(n)+Nj(n)$$

Therefore, equation (9) can be expressed by $$Aj(n)=hj(n)\cdot LM(n)/L1(n)+Nj(n)/L1(n) \quad (10)$$

To simplify the explanation, assume an ideal environment (Nj(n)=0) to which no noise is added. In this case, equation (10) can be simply expressed by $$Aj(n)=hj(n)\cdot LM(n)/L1(n) \quad (11)$$

The effects of channels between adjacent subcarriers transmitted from the same antenna are substantially the same. That is, assuming that the channel characteristic of adjacent subcarriers transmitted from the same antenna have a high positive correlation value, it is expected that the following channel characteristic Aj(n) is obtained from all the receiving antennas.

<One Transmitting Antenna>

Since LM(n)=L1(n) in the case of subcarriers belonging to a group number [1], Aj(n)=hj(n) holds from equation (11). Also, since all subcarriers belonging to a group number [1] are transmitted from one antenna, an estimation value Aj(n) of the channel characteristic of an even-numbered subcarrier and an estimation value Aj(n+1) of the channel characteristic of an adjacent subcarrier having the next number have a high positive correlation.

The same is true for a group number [2], an estimated value Aj(n) of the channel characteristic of an even-numbered subcarrier and an estimation value Aj(n+1) of the channel characteristic of an adjacent subcarrier having the next number have a high positive correlation.

<Two Transmitting Antennas>

For even-numbered subcarriers of the subcarriers belonging to a group number [1], LM(n)=−L1(n) holds from equation (6), so Aj(n)=−hj(n) holds from equation (11). On the other hand, for odd-numbered subcarriers belonging to a group number [1], LM(n)=L1(n) holds from equation (8), so Aj(n)=hj(n) holds from equation (11), i.e., the phase of this characteristic is inverted from that of the actual channel characteristic. Since an even-numbered subcarrier and an adjacent subcarrier having the next number are transmitted from the same antenna, an estimation value Aj(n) of the channel characteristic of the even-numbered subcarrier and an estimation value Aj(n+1) of the channel characteristic of the subcarrier having the next number have a high correlation.

However, Aj(n) corresponds to an odd-numbered subcarrier, and its characteristic has a phase inverted from that of the actual channel. Therefore, the estimation values of these subcarriers have a high negative correlation.

For even-numbered subcarriers of the subcarriers belonging to a group number [2], LM(n)=L1(n) holds from equation (8), so Aj(n)=hj(n) holds from equation (11). On the other hand, for odd-numbered subcarriers belonging to a group number [2], LM(n)=L1(n) holds from equation (8), so Aj(n)=hj(n) holds from equation (11). Since an even-numbered subcarrier and an adjacent subcarrier having the next number are transmitted from the same antenna, an estimation value Aj(n) of the channel characteristic of the even-numbered subcarrier and an estimation value Aj(n+1) of the channel characteristic of the subcarrier having the next number have a high positive correlation.

<Three Transmitting Antennas>

For even-numbered subcarriers of the subcarriers belonging to a group number [1], LM(n)=L1(n) holds from equation (8), so Aj(n)=hj(n) holds from equation (11). On the other hand, for odd-numbered subcarriers belonging to a group number [1], LM(n)=L1(n) holds from equation (8), so Aj(n)=hj(n) holds from equation (11). Since an even-numbered subcarrier and an adjacent subcarrier having the next number are transmitted from the same antenna, an estimation value Aj(n) of the channel characteristic of the even-numbered subcarrier and an estimation value Aj(n+1) of the channel characteristic of the subcarrier having the next number have a high positive correlation.

For even-numbered subcarriers of the subcarriers belonging to a group number [2], LM(n)=L1(n) holds from equation (7), so Aj(n)=−hj(n) holds from equation (11). i.e., the phase of this characteristic is inverted from that of the actual channel characteristic. On the other hand, for odd-numbered subcarriers belonging to a group number [2], LM(n)=L1(n) holds from equation (8), so Aj(n)=hj(n) holds from equation (11). Since an even-numbered subcarrier and an adjacent subcarrier having the next number are transmitted from the same antenna, an estimation value Aj(n) of the channel characteristic of the even-numbered subcarrier and an estimation value Aj(n+1) of the channel characteristic of the subcarrier having the next number have a high correlation. However, Aj(n) corresponds to an odd-numbered subcarrier, and its characteristic has a phase inverted from that of the actual channel. Therefore, the estimation values of these subcarriers have a high negative correlation.

As is apparent from the above description, if combinations of polarities of the correlation values of the group [1] and the group [2] are (positive, positive), respectively, it is determined (estimated) that the number of the transmitting antennas is one, if (negative, positive), it is determined (estimated) that the number is two, and if (positive, negative), the number is three.

The algorithm of estimating the number of transmitting antenna in the receiver shown in FIG. 5 will be described below with reference to FIG. 6. At first, the waveform in the frequency domain of a known symbol received by the jth antenna is input to a dividing unit 33-*j* (steps S1 and S2). The waveform of each subcarrier input to the dividing unit 33-*j* is divided by the known symbol pattern stored in the ROM 34, and thereby converted into a channel characteristic. The channel characteristic is stored in a memory 39-*j*, and input to a correlator 35-*j* (step S3).

The correlation unit 35-*j* calculates, for each group of the subcarriers, correlation values between the estimated values of channel characteristic of the even numbered subcarrier and the estimated values of channel characteristic of odd numbered subcarriers. A correlation value Zk of subcarriers of a group number k is defined as follows.

$$Zk=Aj(Nk)^* Aj(Nk+1)+Aj(Nk+2)^*Aj(Nk+3)+,\ldots,+Aj(Nk+N/2-2)^*Aj(Nk+N/2-1)$$

where, a*b is represented that "a" is multiplied by a complex conjugate of "b", and Nk=N×(k−1)/2.

Correlation values corresponding to receiving antennas 30-1 to 30-M calculated by means of the correlation units 35-1 to 35-M are added at every group, and the first determination unit 37 determines whether the total of the correlation values of each group is positive or negative. The second determination unit 38 stores a reference table as shown in FIG. 8, the table including the combinations of the correlation values of each group and the number of the transmitting antennas. The second determination unit 38 determines (estimates) the number of antennas referring to the table and the correlation values of each group input from the first determination unit 37 (step S4). In the first embodiment, if the combination of the correlation values of the groups input from the first determination unit 37 is (positive, positive), it is determined that there is one antenna (step S5), if (negative, positive), it is determined that there is two antennas (step S6), and if (positive, negative), it is determined that there is three antennas (step S7).

The MIMO receiving unit 40 reproduces data symbols by using the number of the transmitting antennas estimated as described above.

Figure 6:
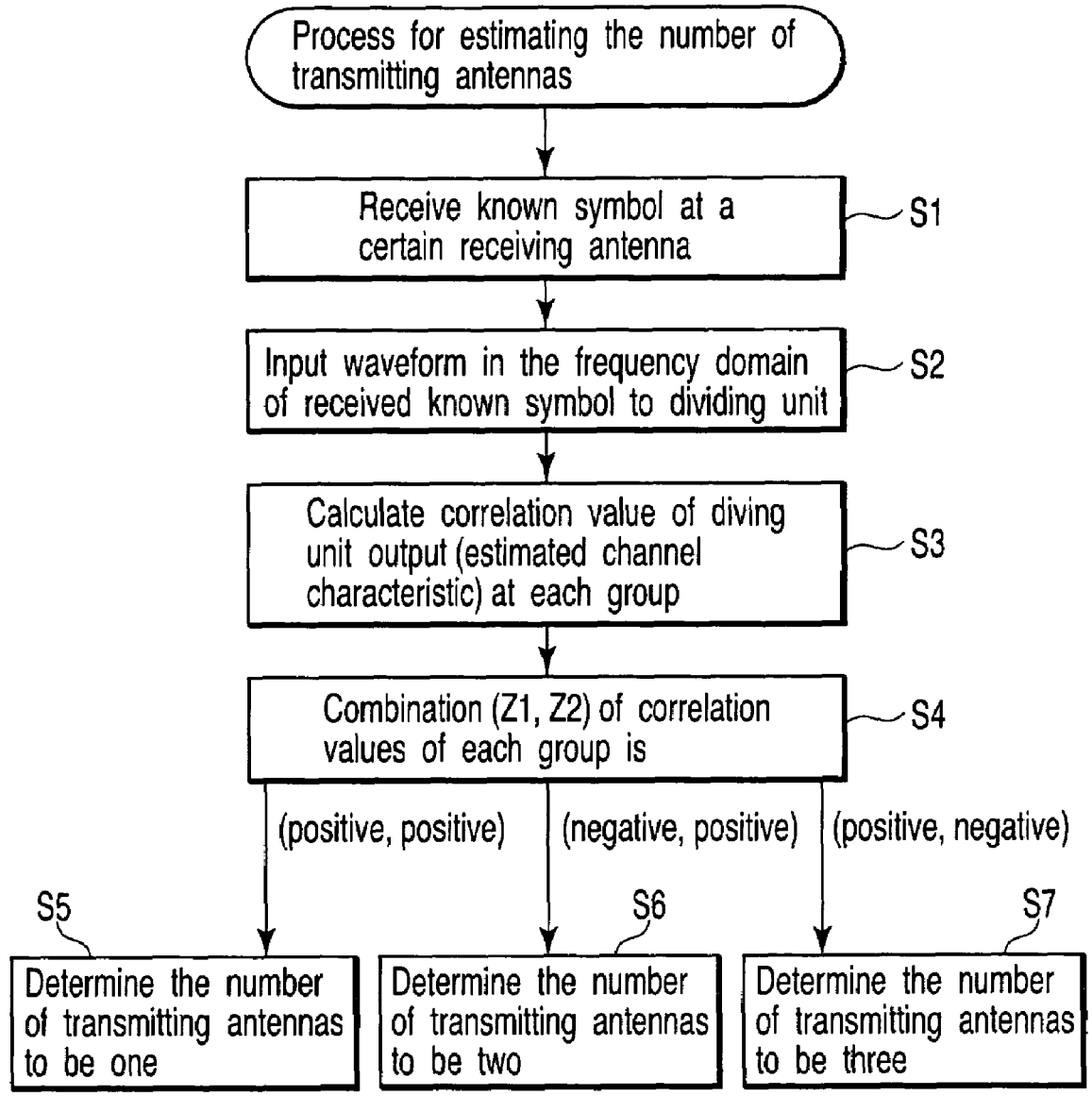
FIG. 6 is a flowchart for explaining a process for estimating the number of transmitting antennas in the receiver shown in FIG. 5.

FIG. 5-FIG. 6 show the examples of the configuration of the receiver and process for estimating the number of transmitting antennas, in the cases that the notification item to be notified on the receiver is the number of the transmitting antennas, however, the configuration of the receiver and the process for estimating are not limited to the case that the notification item is the number of the transmitting antennas. Similar configuration and the process for estimating can be used even in the case that notification item is modulation method for modulating a data field (data symbols, etc.), an encoding method, a coding rate, the number of symbols, the number of information bits (amount of information) and a combination thereof. In this case, the second determination unit 38 in FIG. 5 is changed to a determination unit corresponding to notification item.

As description above, according to the first embodiment, it is possible to estimate notification item used for demodulation of data symbols, such as the number of antennas, while estimating channel response corresponding to every antenna by using the known symbols, without transmitting and using a signal notifying item used for demodulation of data symbols.

Because a correlation of channels between adjacent subcarriers is high, a correlation value calculated between the adjacent subcarriers on the receiver becomes a large value. In this case, the communication apparatus can accurately estimate notification item used for the demodulation of the data symbols and informed by using known symbols.

Second Embodiment

Figure 9:
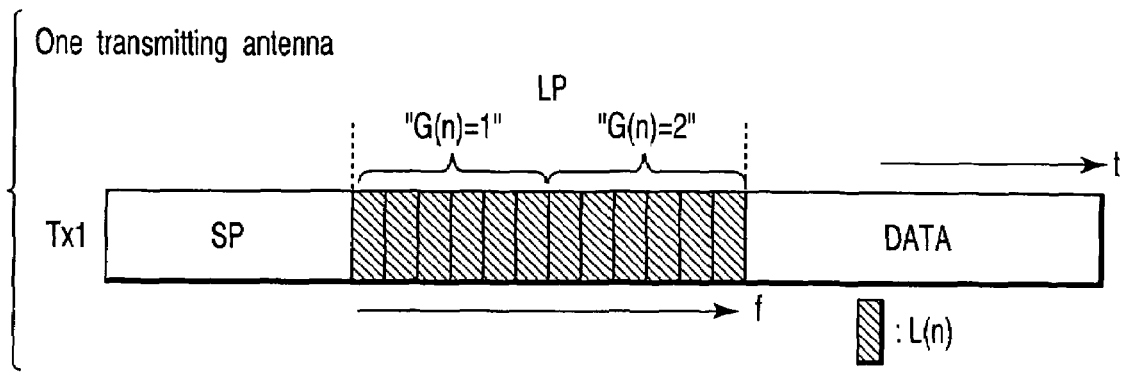
FIG. 9 is a view for explaining a known symbol transmission method, when there is one transmitting antenna, according to the second embodiment.
Figure 10:
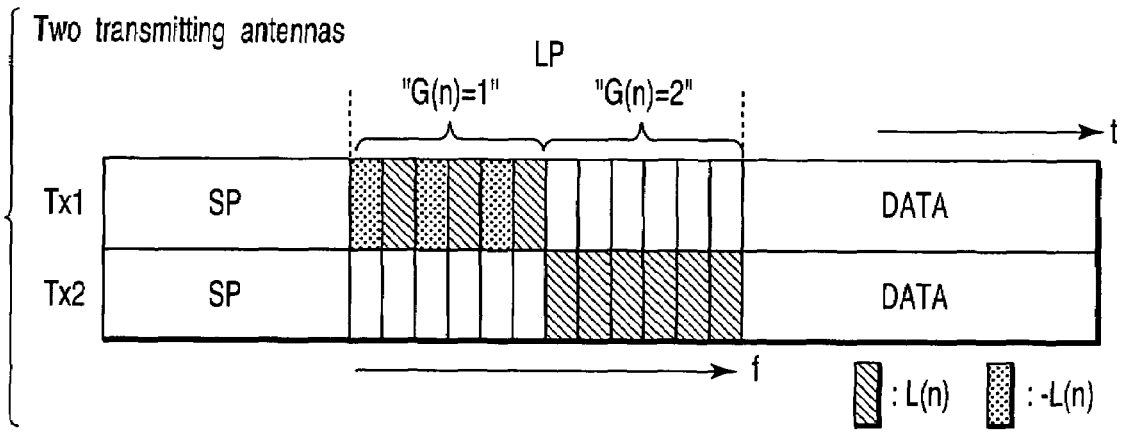
FIG. 10 is a view for explaining a known symbol transmission method, when there is two transmitting antennas, according to the second embodiment.
Figure 11:
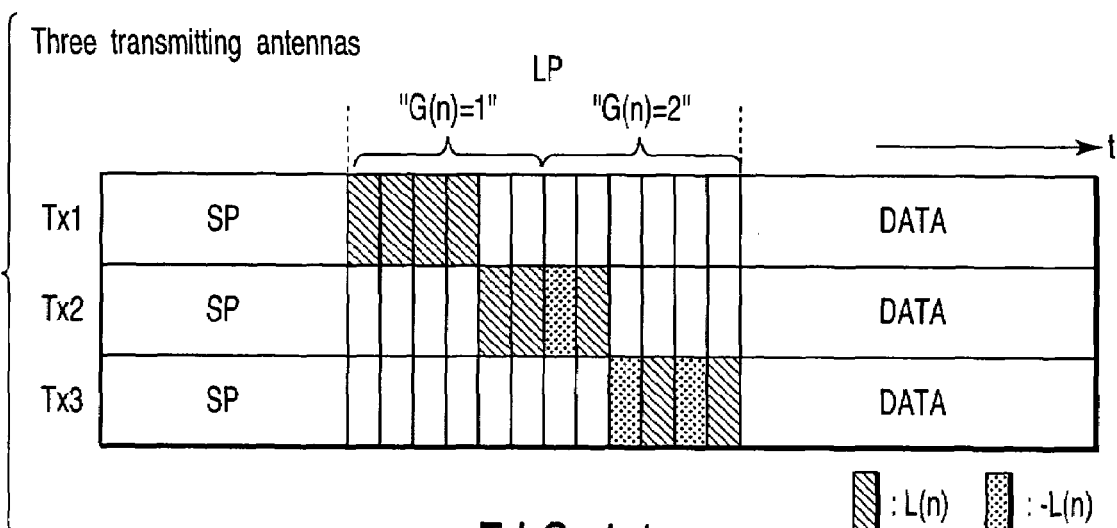
FIG. 11 is a view for explaining a known symbol transmission method, when there is three transmitting antennas, according to the second embodiment.

Next, a known symbol (for channel estimation) transmission method according to a second embodiment will be explained referring to FIG. 9-FIG. 11. FIGS. 9 to 11 illustrate the structures of radio frames containing preambles when there are, respectively, one (Tx1), two (Tx1, Tx2), and three (Tx1, Tx2, Tx3) transmitting antennas which simultaneously transmit known symbols.

In the case of FIG. 9 (M=1: one antenna), the combination of the numbers of subcarriers, in which known information of one known symbol transmitted from antenna 1 (Tx1) exists, group numbers of the subcarriers, and information values carried on these subcarriers are as follows.

The known symbol of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 10 (M=2: two antennas), the combination of the numbers of subcarriers, in which known information of one known symbol transmitted from antenna 1 (Tx1) and antenna 2 (Tx2) exists, group numbers of the subcarriers, and information values carried on these subcarriers are as follows.

The known symbol of the antenna 1: subcarrier numbers (0, 1, 2, 3, 4, 5), group numbers (1, 1, 1, 1, 1, 1), information values [−L1 (0), L1 (1), −L1 (2), −L1 (3), L1 (4), −L1 (5)].

The known symbol of the antenna 2: subcarrier numbers (6, 7, 8, 9, 10, 11), group numbers (2, 2, 2, 2, 2, 2), information values [L1 (6), L1 (7), L1 (8), L1 (9), L1 (10), L1 (11)].

In the case of FIG. 11 (M=3: three antennas), the combination of the numbers of subcarriers, in which known information of one known symbol transmitted from antenna 1 (Tx1), antenna 2 (Tx2) antenna 3 (Tx3) exists, group numbers of the subcarriers, and information values carried on these subcarriers are as follows.

The known symbol of the antenna 1: subcarrier numbers (0, 1, 2, 3), group numbers (1, 1, 1, 1), information values [L1 (0), L1 (1), L1 (2), L1 (3)].

The known symbol of the antenna 2: subcarrier numbers (4, 5, 6, 7), group numbers (1, 1, 2, 2), information values [L1 (4), L1 (5), −L1 (6), L1 (7)].

The known symbol of the antenna 3: subcarrier numbers (8, 9, 10, 11), group numbers (2, 2, 2, 2), information values [−L1 (8), L1 (9), −L1 (10), L1 (11)].

Note that in FIGS. 9 to 11, the preamble structure is represented with time. However, for the sake of convenience, subcarriers on which known information of the long preamble LP exists are represented by oblique lines and dots. Also, subcarriers indicated by dots in FIGS. 9 to 11 represent subcarriers into which known information whose phase is inverted is inserted. The upper sections of each subcarrier, in FIGS. 9 to 11, indicate the group number to which the each subcarrier belongs.

As shown in FIG. 9-FIG. 11, similar to the first embodiment, the known symbols according to the second embodiment, inversion/non-inversion of phase of known information on one of two adjacent subcarriers is controlled at every group to which the two adjacent subcarriers belong, in accordance with notification item (for example, the number of the transmitting antennas) to be notified to the receiver. Thereby, similar to the first embodiment, the number of the transmitting antennas can be estimated by using the receiver in FIG. 5.

FIG. 9-FIG. 11 show the examples in the cases that the maximum number Mmax of the transmitting antennas is three, however, they can expandable in the cases that the number Mmax is four. In this cases, since there should be Mmax pieces of patterns corresponding to the number of antennas Mmax, Ng (the number of groups) is obtained from the formula (1) with Np=Mmax substituted therein. And subcarriers are classified into one of the Ng groups, inverse/non-inverse of phases of the adjacent two subcarriers in the known symbols are controlled at every group in accordance with the number of antennas.

FIG. 9-FIG. 11 show the examples in the cases that the notification item to be notified on the receiver is the number of the transmitting antennas, however, the notification item to be notified is not limited to the number of the antennas, notification item such as a modulation method for modulating a data field, an encoding method, a coding rate, the number of symbols, the number of information bits and a combination thereof is acceptable. In these cases, Ng (the number of groups) is obtained from the formula (1) in accordance with the number of patterns corresponding to the number of notification items to be notified on the receiver. And subcarriers are classified into one of the Ng groups, inverse/non-inverse of phases of the two adjacent subcarriers in the known symbols are controlled in accordance with the group to which the two adjacent subcarriers belong and the number of antennas.

Third Embodiment

Figure 12:
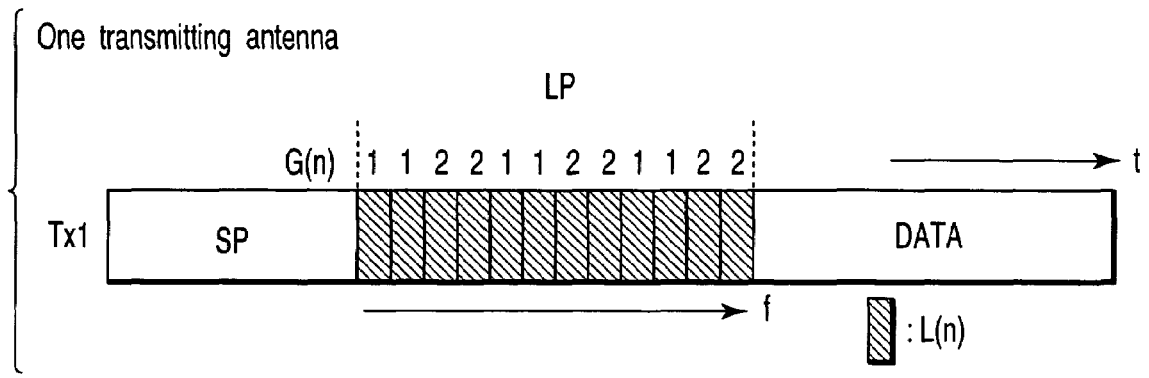
FIG. 12 is a view for explaining a known symbol transmission method, when there is one transmitting antenna, according to the third embodiment.
Figure 13:
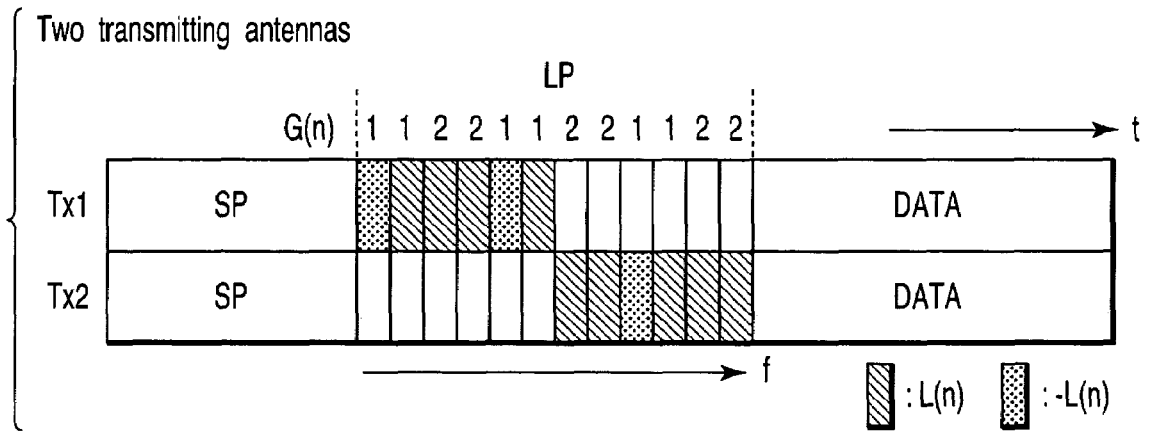
FIG. 13 is a view for explaining a known symbol transmission method, when there is two transmitting antennas, according to the third embodiment.
Figure 14:
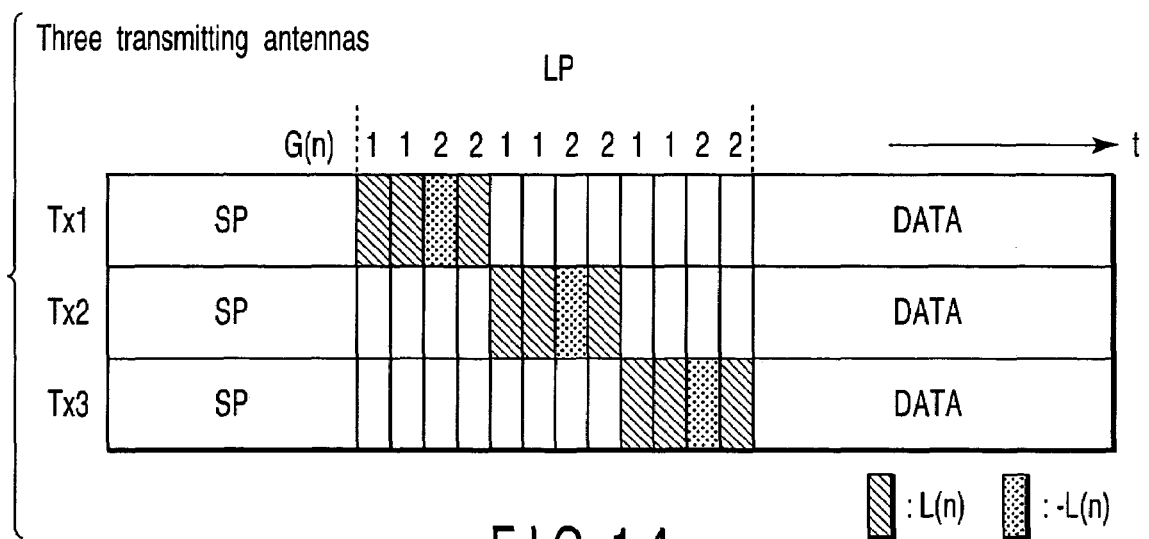
FIG. 14 is a view for explaining a known symbol transmission method, when there is three transmitting antennas, according to the third embodiment.

Next, a known symbol (for channel estimation) transmission method according to a third embodiment will be explained referring to FIG. 12-FIG. 14. FIGS. 12 to 14 illustrate the structures of radio frames containing preambles when there are, respectively, one (Tx1), two (Tx1, Tx2), and three (Tx1, Tx2, Tx3) transmitting antennas which simultaneously transmit known symbols.

In the case of FIG. 12 (M=1: one antenna), the combination of the numbers of subcarriers, in which known information of one known symbol transmitted from antenna 1 (Tx1) exists, group numbers of the subcarriers, and information values carried on these subcarriers are as follows.

The known symbol of the antenna 1: subcarrier numbers (0, 1, 2, 3, 4, 5, 6, 7, 8, 9, 10, 11), group numbers (1, 1, 2, 2, 1, 1, 2, 2, 1, 1, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 13 (M=2: two antennas), the combination of the numbers of subcarriers, in which known information of one known symbol transmitted from antenna 1 (Tx1) and antenna 2 (Tx2) exists, group numbers of the subcarriers, and information values carried on these subcarriers are as follows.

The known symbol of the antenna 1: subcarrier numbers (0, 1, 2, 3, 4, 5), group numbers (1, 1, 2, 2, 1, 1), information values [−L1 (0), L1 (1), L1 (2), L1 (3), −L1 (4), L1 (5)].

The known symbol of the antenna 2: subcarrier numbers (6, 7, 8, 9, 10, 11), group numbers (2, 2, 1, 1, 2, 2), information values [L1 (6), L1 (7), −L1 (8), L1 (9), L1 (10), L1 (11)].

In the case of FIG. 14 (M=3: three antennas), the combination of the numbers of subcarriers, in which known information of one known symbol transmitted from antenna 1 (Tx1), antenna 2 (Tx2) antenna 3 (Tx3) exists, group numbers of the subcarriers, and information values carried on these subcarriers are as follows.

The known symbol of the antenna 1: subcarrier numbers (0, 1, 2, 3), group numbers (1, 1, 2, 2), information values [L1 (0), L1 (1), −L1 (2), L1 (3)].

The known symbol of the antenna 2: subcarrier numbers (4, 5, 6, 7), group numbers (1, 1, 2, 2), information values [L1 (4), L1 (5), −L1 (6), L1 (7)].

The known symbol of the antenna 3: subcarrier numbers (8, 9, 10, 11), group numbers (1, 1, 2, 2), information values [L1 (8), L1 (9), −L1 (10), L1 (11)].

Note that in FIGS. 12 to 14, the preamble structure is represented with time. However, for the sake of convenience, subcarriers on which information of the long preamble LP exists are represented by oblique lines and dots. Also, subcarriers indicated by dots represent subcarriers into which known information whose phase is inverted is inserted. The upper sections of each subcarrier, in FIGS. 12 to 14, indicate the group number to which the each subcarrier belongs.

As shown in FIG. 12-FIG. 14, similar to the first and second embodiments, the known symbols according to the third embodiment, inversion/non-inversion of phase of known information on one of two adjacent subcarriers is controlled at every, in accordance with the group to which the two adjacent subcarriers belong and notification item (for example, the number of the transmitting antennas) to be notified to the receiver. Thereby, similar to the first and second embodiments, the number of the transmitting antennas can be estimated by using the receiver in FIG. 5.

FIG. 12-FIG. 14 show the examples in the cases that the maximum number Mmax of the transmitting antennas is three, however, they can expandable in the cases that the number Mmax is four. In this cases, since there should be Mmax pieces of patterns corresponding to the number of antennas Mmax, Ng (the number of groups) is obtained from the formula (1) with Np=Mmax substituted therein. And subcarriers are classified into one of the Ng groups, inverse/non-inverse of phases of the adjacent two subcarriers in the known symbols are controlled at every group in accordance with the number of antennas.

FIG. 12-FIG. 14 show the examples in the cases that the notification item to be notified on the receiver is the number of the transmitting antennas, however, the notification item to be notified is not limited to the number of the antennas, notification item such as a modulation method for modulating a data field, an encoding method, a coding rate, the number of symbols, the number of information bits and a combination thereof is acceptable. In these cases, Ng (the number of groups) is obtained from the formula (1) in accordance with the number of patterns corresponding to the number of notification items to be notified on the receiver. And subcarriers are classified into one of the Ng groups, inverse/non-inverse of phases of the adjacent two subcarriers in the known symbols are controlled at every group in accordance with the number of antennas.

Fourth Embodiment

Figure 15:
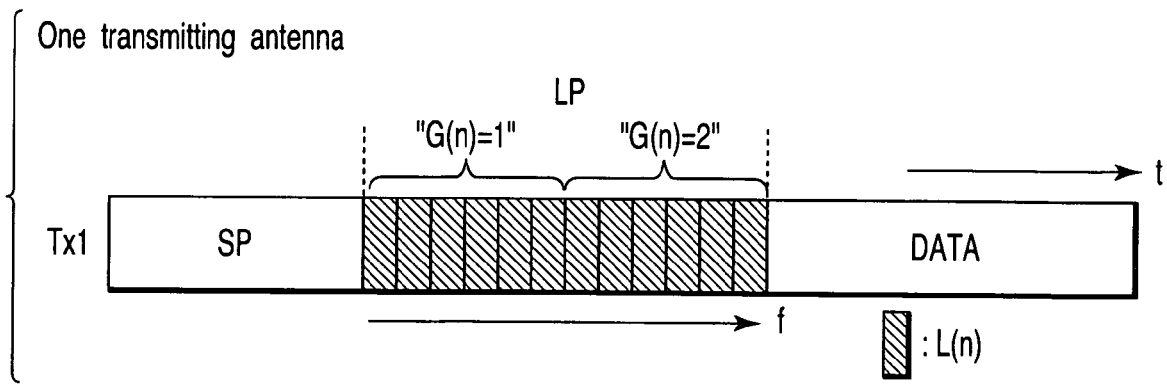
FIG. 15 is a view for explaining a known symbol transmission method, when there is one transmitting antenna, according to the fourth embodiment.
Figure 16:
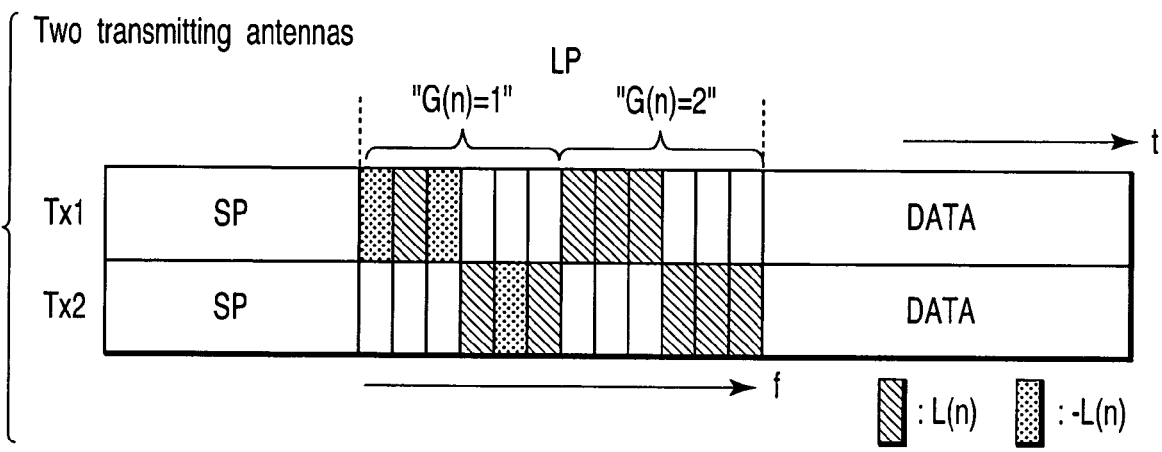
FIG. 16 is a view for explaining a known symbol transmission method, when there is two transmitting antennas, according to the fourth embodiment.
Figure 17:
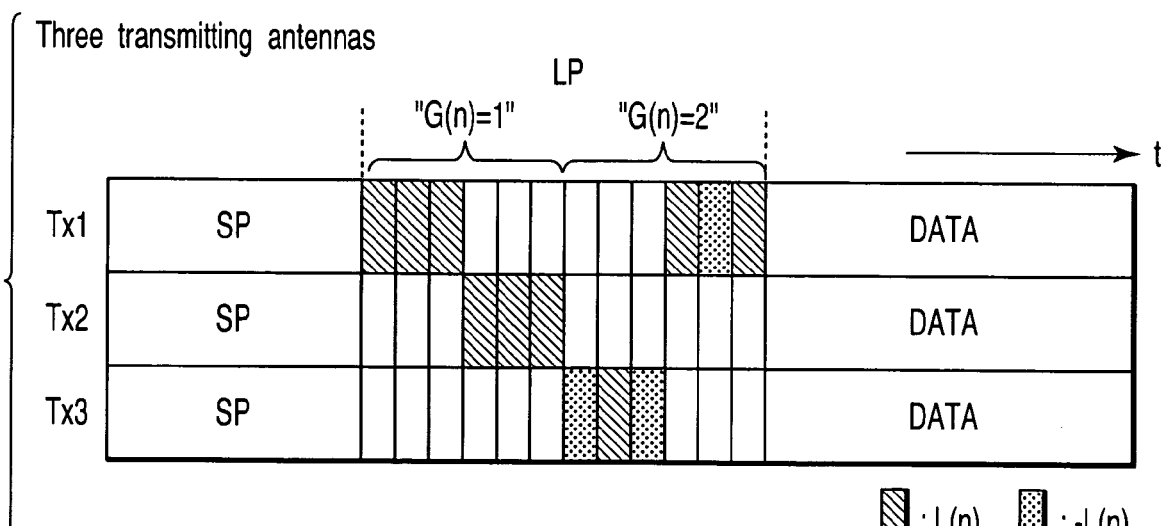
FIG. 17 is a view for explaining a known symbol transmission method, when there is three transmitting antennas, according to the fourth embodiment.

Next, a known symbol (for channel estimation) transmission method according to a second embodiment will be explained referring to FIG. 15-FIG. 17. FIGS. 15 to 17 illustrate the structures of radio frames containing preambles when there are, respectively, one (Tx1), two (Tx1, Tx2), and three (Tx1, Tx2, Tx3) transmitting antennas which simultaneously transmit known symbols.

In the case of FIG. 15 (M=1: one antenna), the combination of the numbers of subcarriers, in which known information of one known symbol transmitted from antenna 1 (Tx1) exists, group numbers of the subcarriers, and information values carried on these subcarriers are as follows.

The known symbol of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 16 (M=2: two antennas), the combination of the numbers of subcarriers, in which known information of one known symbol transmitted from antenna 1 (Tx1) and antenna 2 (Tx2) exists, group numbers of the subcarriers, and information values carried on these subcarriers are as follows.

The known symbol of the antenna 1: subcarrier numbers (0, 1, 2, 6, 7, 8), group numbers (1, 1, 1, 2, 2, 2), information values [−L1 (0), L1 (1), −L1 (2), L1 (6), L1 (7), L1 (8)].

The known symbol of the antenna 2: subcarrier numbers (3, 4, 5, 9, 10, 11), group numbers (1, 1, 1, 2, 2, 2), information values [L1 (3), −L1 (4), L1 (5), L1 (9), L1 (10), L1 (11)].

In the case of FIG. 17 (M=3: three antennas), the combination of the numbers of subcarriers, in which known information of one known symbol transmitted from antenna 1 (Tx1), antenna 2 (Tx2) antenna 3 (Tx3) exists, group numbers of the subcarriers, and information values carried on these subcarriers are as follows.

The known symbol of the antenna 1: subcarrier numbers (0, 1, 2, 9, 10, 11), group numbers (1, 1, 1, 2, 2, 2), information values [L1 (0), L1 (1), L1 (2), L1 (9), −L1 (10), L1 (11)].

The known symbol of the antenna 2: subcarrier numbers (3, 4, 5,), group numbers (1, 1, 1), information values [L1 (3), L1 (4), L1 (5)].

The known symbol of the antenna 3: subcarrier numbers (6, 7, 8), group numbers (2, 2, 2), information values [−L1 (6), L1 (7), −L1 (8)].

Note that in FIGS. 15 to 17, the preamble structure is represented with time. However, for the sake of convenience, subcarriers on which known information of the long preamble LP exists are represented by oblique lines and dots. Also, subcarriers indicated by dots in FIGS. 15 to 17 represent subcarriers into which known information whose phase is inverted is inserted. The upper sections of each subcarrier, in FIGS. 15 to 17, indicate the group number to which the each subcarrier belongs.

As shown in FIG. 15-FIG. 17, similar to the first, second and third embodiments, the known symbols according to the fourth embodiment, inversion/non-inversion of phase of known information on one of two adjacent subcarriers is controlled at every group to which the two adjacent subcarriers belong, in accordance with notification item,(for example, the number of the transmitting antennas) to be notified to the receiver. Thereby, similar to the first, second and third embodiments, the number of the transmitting antennas can be estimated by using the receiver in FIG. 5.

FIG. 15-FIG. 17 show the examples in the cases that the maximum number Mmax of the transmitting antennas is three, however, they can expandable in the cases that the number Mmax is four. In this cases, since there should be Mmax pieces of patterns corresponding to the number of antennas Mmax, Ng (the number of groups) is obtained from the formula (1) with Np=Mmax substituted therein. And subcarriers are classified into one of the Ng groups, inverse/non-inverse of phases of the adjacent two subcarriers in the known symbols are controlled at every group in accordance with the number of antennas.

FIG. 15-FIG. 17 show the examples in the cases that the notification item to be notified on the receiver is the number of the transmitting antennas, however, the notification item to be notified is not limited to the number of the antennas, notification item such as a modulation method for modulating a data field, an encoding method, a coding rate, the number of symbols, the number of information bits and a combination thereof is acceptable. In these cases, Ng (the number of groups) is obtained from the formula (1) in accordance with the number of patterns corresponding to the number of notification items to be notified on the receiver. And subcarriers are classified into one of the Ng groups, inverse/non-inverse of phases of the adjacent two subcarriers in the known symbols are controlled at every group in accordance with the number of antennas.

Fifth Embodiment

Figure 18:
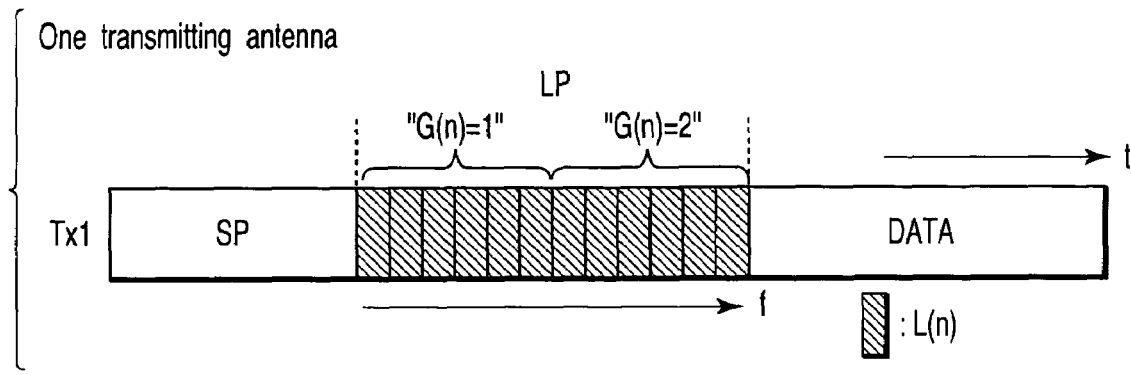
FIG. 18 is a view for explaining a known symbol transmission method, when there is one transmitting antenna, according to the fifth embodiment.
Figure 19:
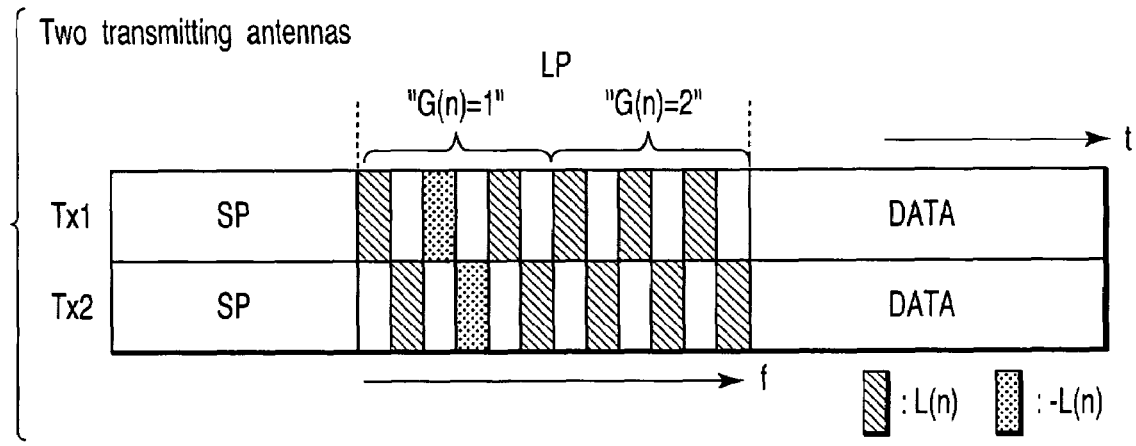
FIG. 19 is a view for explaining a known symbol transmission method, when there is two transmitting antennas, according to the fifth embodiment.
Figure 20:
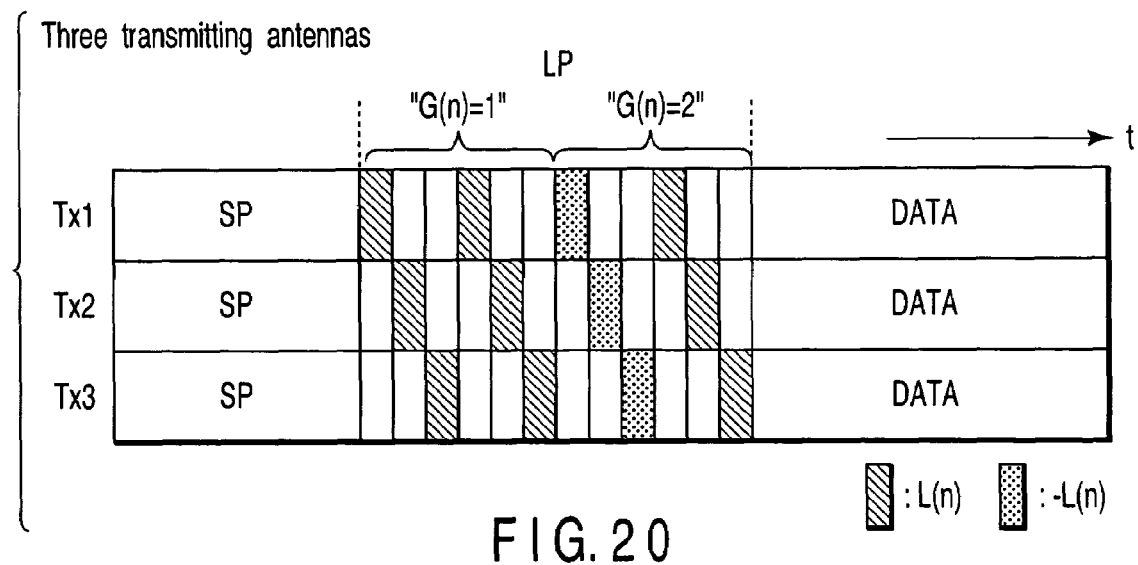
FIG. 20 is a view for explaining a known symbol transmission method, when there is three transmitting antennas, according to the fifth embodiment.

Next, a known symbol (for channel estimation) transmission method according to a third embodiment will be explained referring to FIG. 18-FIG. 20. FIGS. 18 to 20 illustrate the structures of radio frames containing preambles when there are, respectively, one (Tx1), two (Tx1, Tx2), and three (Tx1, Tx2, Tx3) transmitting antennas which simultaneously transmit known symbols.

In the case of FIG. 18 (M=1: one antenna), the combination of the numbers of subcarriers, in which known information of one known symbol transmitted from antenna 1 (Tx1) exists, group numbers of the subcarriers, and information values carried on these subcarriers are as follows.

The known symbol of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 19 (M=2: two antennas), the combination of the numbers of subcarriers, in which known information of one known symbol transmitted from antenna 1 (Tx1) and antenna 2 (Tx2) exists, group numbers of the subcarriers, and information values carried on these subcarriers are as follows.

The known symbol of the antenna 1: subcarrier numbers (0, 2, 4, 6, 8, 10), group numbers (1, 1, 1, 2, 2, 2), information values [L1 (0), −L1 (2), L1 (4), L1 (6), L1 (8), L1 (10)].

The known symbol of the antenna 2: subcarrier numbers (1, 3, 5, 7, 9, 11), group numbers (1, 1, 1, 2, 2, 2), information values [L1 (1), −L1 (3), L1 (5), L1 (7), L1 (9), L1 (11)].

In the case of FIG. 20 (M=3: three antennas), the combination of the numbers of subcarriers, in which known information of one known symbol transmitted from antenna 1 (Tx1), antenna 2 (Tx2) antenna 3 (Tx3) exists, group numbers of the subcarriers, and information values carried on these subcarriers are as follows.

The known symbol of the antenna 1: subcarrier numbers (0, 3, 6, 9), group numbers (1, 1, 2, 2), information values [L1 (0), L1 (3), −L1 (6), L1 (9)].

The known symbol of the antenna 2: subcarrier numbers (1, 4, 7, 10), group numbers (1, 1, 2, 2), information values [L1 (1), L1 (4), −L1 (7), L1 (10)].

The known symbol of the antenna 3: subcarrier numbers (2, 5, 8, 11), group numbers (1, 1, 2, 2), information values [L1 (2), L1 (5), −L1 (8), L1 (11)].

Note that in FIGS. 18 to 20, the preamble structure is represented with time. However, for the sake of convenience, subcarriers on which known information of the long preamble LP exists are represented by oblique lines and dots. Also, subcarriers indicated by dots represent subcarriers into which known information whose phase is inverted is inserted. The upper sections of each subcarrier, in FIGS. 18 to 20, indicate the group number to which the each subcarrier belongs.

As shown in FIG. 18-FIG. 20, the known symbols according to the fifth embodiment, inversion/non-inversion of phase of known information on one of two adjacent subcarriers is controlled at every group to which the two adjacent subcarriers belong, in accordance with notification item (for example, the number of the transmitting antennas) to be notified to the receiver. Thereby, in the case that the channel characteristics of adjacent subcarriers have high correlation, similar to the first through the fourth embodiments, the number of the transmitting antennas can be estimated by using the receiver in FIG. 5.

FIG. 18-FIG. 20 show the examples in the cases that the maximum number Mmax of the transmitting antennas is three, however, they can expandable in the cases that the number Mmax is four. In this cases, since there should be Mmax pieces of patterns corresponding to the number of antennas Mmax, Ng (the number of groups) is obtained from the formula (1) with Np=Mmax substituted therein. And subcarriers are classified into one of the Ng groups, inverse/non-inverse of phases of the adjacent two subcarriers in the known symbols are controlled at every group in accordance with the number of antennas.

FIG. 18-FIG. 20 show the examples in the cases that the notification item to be notified on the receiver is the number of the transmitting antennas, however, the notification item to be notified is not limited to the number of the antennas, notification item such as a modulation method for modulating a data field, an encoding method, a coding rate, the number of symbols, the number of information bits and a combination thereof is acceptable. In these cases, Ng (the number of groups) is obtained from the formula (1) in accordance with the number of patterns corresponding to the number of notification items to be notified on the receiver. And subcarriers are classified into one of the Ng groups, inverse/non-inverse of phases of the adjacent two subcarriers in the known symbols are controlled at every group in accordance with the number of antennas.

Sixth Embodiment

Next, a known symbol (for channel estimation) transmission method according to a sixth embodiment will be explained referring to FIG. 21-FIG. 25. In the first to the fifth embodiments, although, notification item such as the number of the transmitting antennas is notified by using one known symbol, in the sixth embodiment the notification item is notified by using a plurality of known symbols.

Figure 21:
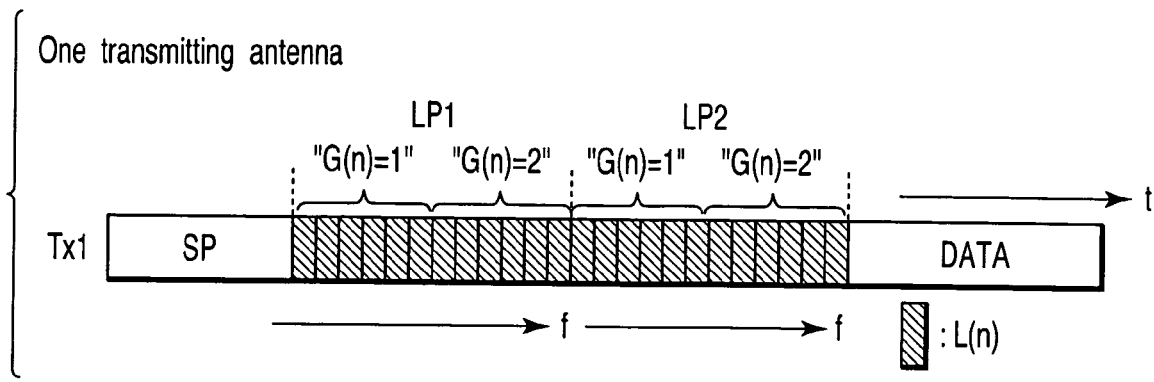
FIG. 21 is a view for explaining a known symbol transmission method, when there is one transmitting antenna, according to the sixth embodiment.
Figure 22:
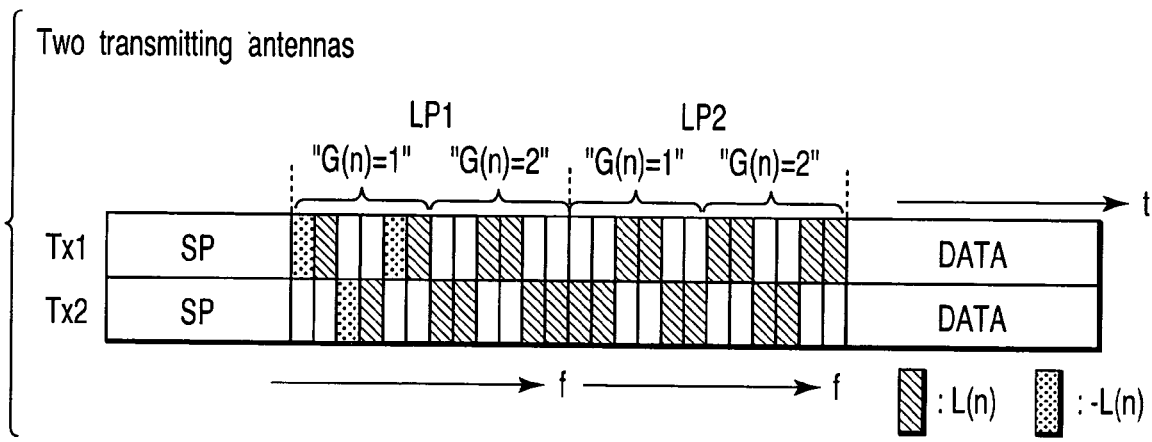
FIG. 22 is a view for explaining a known symbol transmission method, when there is two transmitting antennas, according to the sixth embodiment.
Figure 23:
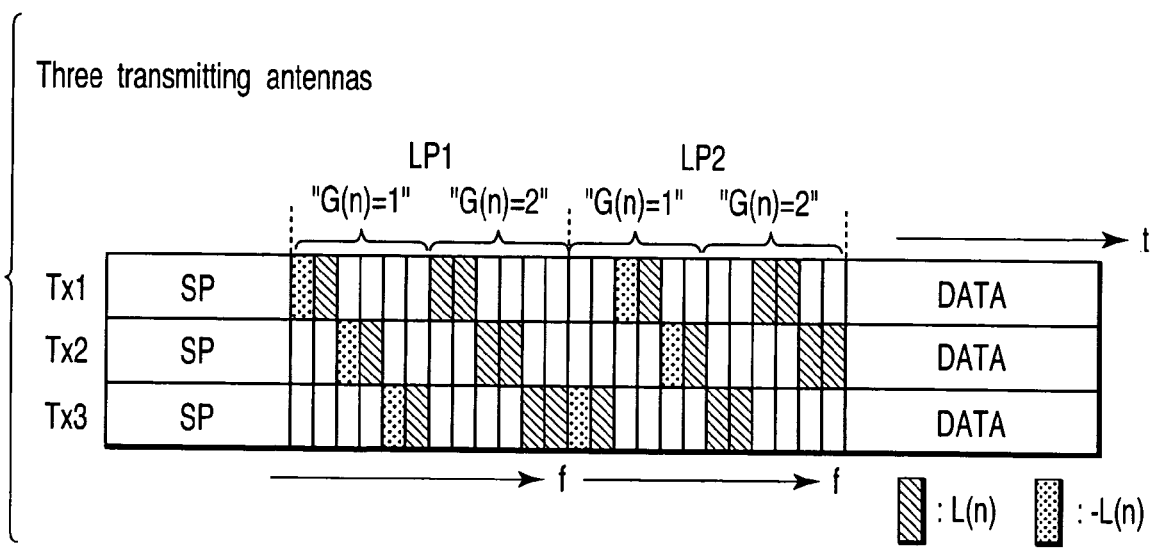
FIG. 23 is a view for explaining a known symbol transmission method, when there is three transmitting antennas, according to the sixth embodiment.
Figure 24:
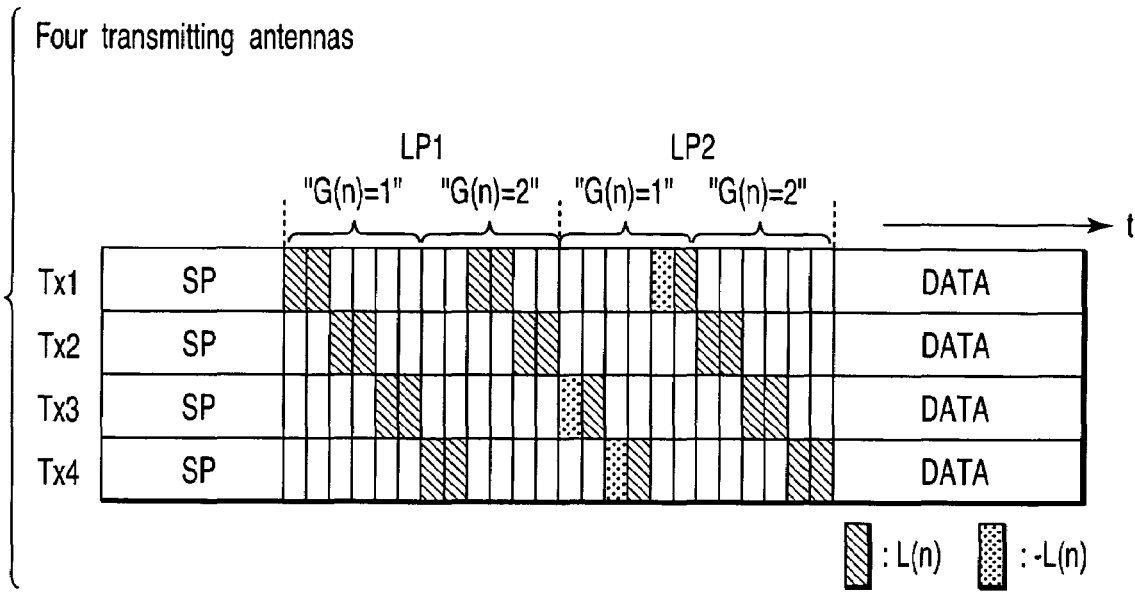
FIG. 24 is a view for explaining a known symbol transmission method, when there is four transmitting antennas, according to the sixth embodiment.
Figure 25:
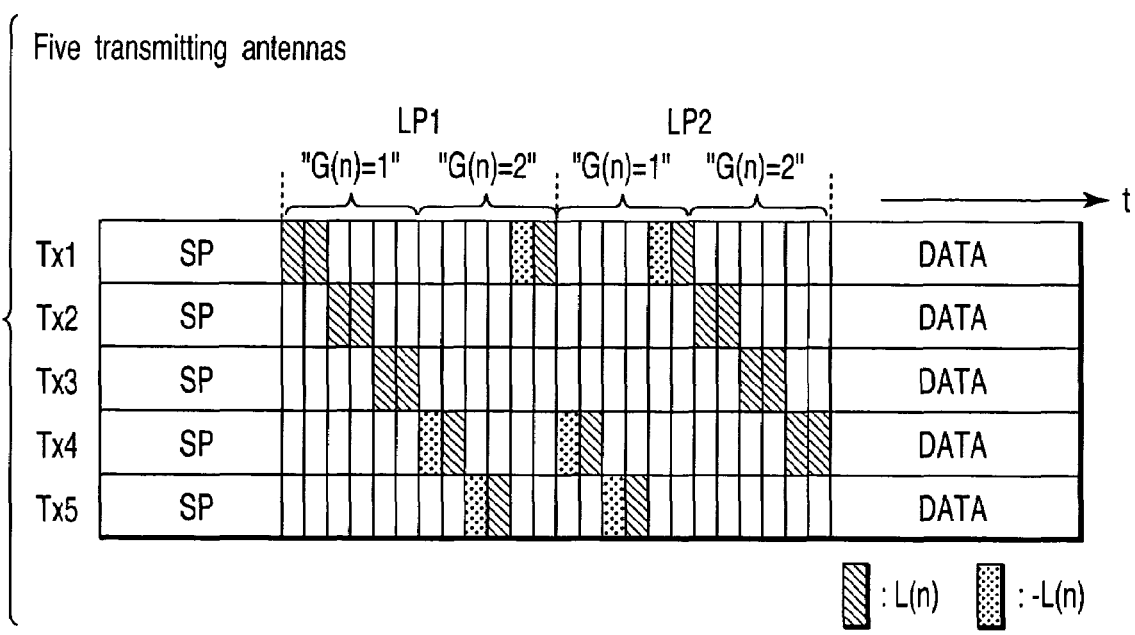
FIG. 25 is a view for explaining a known symbol transmission method, when there is five transmitting antennas, according to the sixth embodiment.

FIGS. 21 to 23 illustrate the structures of radio frames containing preambles when there are, respectively, one (Tx1), two (Tx1, Tx2), and three (Tx1, Tx2, Tx3) transmitting antennas which simultaneously transmit known symbols. FIGS. 24 to 25 illustrate the structures of radio frames containing preambles when there are, respectively, four (Tx1, Tx2, Tx3, Tx4) and five (Tx1, Tx2, Tx3, Tx4 Tx5) transmitting antennas which simultaneously transmit known symbols.

In the case of FIG. 21 (M=1: one antenna), the combination of the numbers of subcarriers, in which known information of each known symbol transmitted from antenna 1 (Tx1) exists, group numbers of the subcarriers, and information values carried on these subcarriers are as follows.

The known symbol LP1 of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

The known symbol LP2 of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 22 (M=2: two antennas), the combination of the numbers of subcarriers, in which known information of each known symbol transmitted from antenna 1 (Tx1) and antenna 2 (Tx2) exists, group numbers of the subcarriers, and information values carried on these subcarriers are as follows.

The known symbol LP1 of the antenna 1: subcarrier numbers (0, 1, 4, 5, 8, 9), group numbers (1, 1, 1, 1, 2, 2), information values [−L1 (0), L1 (1), −L1 (4), L1 (5), L1 (8), L1 (9)].

The known symbol LP2 of the antenna 1: subcarrier numbers (2, 3, 6, 7, 10, 11), group numbers (1, 1, 2, 2, 2, 2), information values [L1 (2), L1 (3), L1 (6), L1 (7), L1 (10), L1 (11)].

The known symbol LP1 of the antenna 2: subcarrier numbers (2, 3, 6, 7, 10, 11), group numbers (1, 1, 2, 2, 2, 2), information values [−L1 (2), L1 (3), L1 (6), L1 (7), L1 (10), L1 (11)].

The known symbol LP2 of the antenna 2: subcarrier numbers (0, 1, 4, 5, 8, 9), group numbers (1, 1, 1, 1, 2, 2), information values [L1 (0), L1 (1), L1 (4), L1 (5), L1 (8), L1 (9)].

In the case of FIG. 23 (M=3: three antennas), the combination of the numbers of subcarriers, in which known information of each known symbol transmitted from antenna 1 (Tx1), antenna 2 (Tx2) antenna 3 (Tx3) exists, group numbers of the subcarriers, and information values carried on these subcarriers are as follows.

The known symbol LP1 of the antenna 1: subcarrier numbers (0, 1, 6, 7), group numbers (1, 1, 2, 2), information values [−L1 (0), L1 (1), L1 (6), L1 (7)].

The known symbol LP2 of the antenna 1: subcarrier numbers (2, 3, 8, 9), group numbers (1, 1, 2, 2), information values [−L1 (2), L1 (3), L1 (8), L1 (9)].

The known symbols LP1 of the antenna 2: subcarrier numbers (2, 3, 8, 9), group numbers (1, 1, 2, 2), information values [−L1 (2), L1 (3), L1 (8), L1 (9)].

The known symbols LP2 of the antenna 2: subcarrier numbers (4, 5, 10, 11), group numbers (1, 1, 2, 2), information values [−L1 (4), L1 (5), L1 (10), L1 (11)].

The known symbols LP1 of the antenna 3: subcarrier numbers (4, 5, 10, 11), group numbers (1, 1, 2, 2), information values [−L1 (4), L1 (5), L1 (10), L1 (11)].

The known symbols LP2 of the antenna 3: subcarrier numbers (0, 1, 6, 7), group numbers (1, 1, 2, 2), information values [−L1 (0), L1 (1), L1 (6), L1 (7)].

In the case of FIG. 24 (M=4: four antennas), the combination of the numbers of subcarriers, in which known information of each known symbol transmitted from antenna 1 (Tx1), antenna 2 (Tx2), antenna 3 (Tx3), and antenna 4 (Tx4) exists, group numbers of the subcarriers, and information values carried on these subcarriers are as follows.

The known symbol LP1 of the antenna 1: subcarrier numbers (0, 1, 8, 9), group numbers (1, 1, 2, 2), information values [L1 (0), L1 (1), L1 (8), L1 (9)].

The known symbol LP2 of the antenna 1: subcarrier numbers (4, 5), group numbers (1, 1), information values [−L1 (4), L1 (5)].

The known symbol LP1 of the antenna 2: subcarrier numbers (2, 3, 10, 11), group numbers (1, 1, 2, 2), information values [L1 (2), L1 (3), L1 (10), L1 (11)].

The known symbol LP2 of the antenna 2: subcarrier numbers (6, 7), group numbers (2, 2), information values [L1 (6), L1 (7)].

The known symbol LP1 of the antenna 3: subcarrier numbers (4, 5), group numbers (1, 1), information values [L1 (4), L1 (5)].

The known symbol LP2 of the antenna 3: subcarrier numbers (0, 1, 8, 9), group numbers (1, 1, 2, 2), information values [−L1 (0), L1 (1), L1 (8), L1 (9)].

The known symbol LP1 of the antenna 4: subcarrier numbers (6, 7), group numbers (2, 2), information values [L1 (6), L1 (7)].

The known symbols LP2 of the antenna 4: subcarrier numbers (2, 3, 10, 11), group numbers (1, 1, 2, 2), information values [−L1 (2), L1 (3), L1 (1), L1 (11)].

In the case of FIG. 25 (M=5: five antennas), the combination of the numbers of subcarriers, in which known information of each known symbol transmitted from antenna 1 (Tx1), antenna 2 (Tx2), antenna 3 (Tx3), antenna 4 (Tx4), and antenna 5 (Tx5) exists, group numbers of the subcarriers, and information values carried on these subcarriers are as follows.

The known symbol LP1 of the antenna 1: subcarrier numbers (0, 1, 10, 11), group numbers (1, 1, 2, 2), information values [L1 (0), L1 (1), −L1 (10), L1 (11)].

The known symbol LP2 of the antenna 1: subcarrier numbers (4, 5), group numbers (1, 1), information values [−L1 (4), L1 (5)].

The known symbols LP1 of the antenna 2: subcarrier numbers (2, 3), group numbers (1, 1), information values [L1 (2), L1 (3)].

The known symbols LP2 of the antenna 2: subcarrier numbers (6, 7), group numbers (1, 1), information values [L1 (6), L1 (7)].

The known symbols LP1 of the antenna 3: subcarrier numbers (4, 5), group numbers (1, 1), information values [L1 (4), L1 (5)].

The known symbols LP2 of the antenna 3: subcarrier numbers (8, 9), group numbers (1, 1), information values [L1 (8), L1 (9)].

The known symbols LP1 of the antenna 4: subcarrier numbers (6, 7), group numbers (1, 1), information values [−L1 (6), L1 (7)].

The known symbols LP2 of the antenna 4: subcarrier numbers (0, 1, 10, 11), group numbers (1, 1, 2, 2), information values [−L1 (0), L1 (1), L1 (10), L1 (11)].

The known symbols LP1 of the antenna 5: subcarrier numbers (8, 9), group numbers (1, 1), information values [−L1 (8), L1 (9)].

The known symbols LP2 of the antenna 5: subcarrier numbers (2, 3), group numbers (1, 1), information values [−L1 (2), L1 (3)].

Note that in FIGS. 21 to 25, the preamble structure is represented with time. However, for the sake of convenience, subcarriers on which known information of the long preamble LP1 and LP2 exist are represented by oblique lines and dots. Also, subcarriers indicated by dots in FIGS. 21 to 25 represent subcarriers into which known information whose phase is inverted is inserted. The upper sections of each subcarrier, in FIGS. 21 to 25, indicate the group number to which the each subcarrier belongs.

As shown in FIG. 21-FIG. 25, the known symbols according to the sixth embodiment, inversion/non-inversion of phase of known information on one of two adjacent subcarriers is controlled at every group and known symbol number to which the two adjacent subcarriers belong, in accordance with the group to which two adjacent subcarriers belong and notification item (for example, the number of the transmitting antennas) to be notified to the receiver.

FIG. 26 shows the example of the configuration of the receiver according to the sixth embodiment. In FIG. 26, the same parts as those of in FIG. 5 are designated by the same reference symbols. The configuration of the receiver in FIG. 26 differs from that of in FIG. 5 in the existence of an additional memory 42.

In FIG. 26, the plurality of receiving antennas 30-1 to 30-M receive OFDM signals in radio frequency (RF) band transmitted from the transmitter in FIG. 1. The OFDM signals received by the receiving antennas 30-1 to 30-M are input to the receiving unit 31.

In the receiving unit 31, the input OFDM signals from the receiving antennas 30-1 to 30-M are amplified by a low-noise amplifier (LNA), and converted (down-converted) into a base band by a frequency converter. In addition, these frequency-converted signals are converted into digital signals by an analog-to digital (A/D) converter, and the guard intervals (GIs) are removed from the digital signals.

The output signals from the receiving units 31 are input to fast Fourier transform (FFT) units 32-1 to 32-M where these waveform signals in the time domain are transformed into waveform signals in the frequency domain, i.e., into the waveforms of individual subcarriers. Of the output signals from the FFT units 32-1 to 32-M, signals of data symbol sections are input to an MIMO signal processing unit 40.

On the other hand, of the output signals from the FFT units 32-1 to 32-M, signals of preambles, particularly, known symbol sections are input to dividing units 33-1 to 33-M. The waveforms of the individual subcarriers input to these dividing units are divided by a known symbol pattern stored in a ROM 34, and thereby converted into estimation values of the channel characteristics. These estimation values are stored in memories 39-1 to 39-M and input to correlators 35-1 to 35-M. The known information pattern stored in the ROM 34 is the same as in the case of FIG. 21 (when one antenna (M=1)).

The correlators 35-1 to 35-M calculate each correlation value corresponding to each group by using the channel characteristic estimation values, based on group information of subcarriers from a group information generator 36, and input the correlation value to a first determination unit 37. The group information generator 36 is composed similarly to that of the group information generator 17 in FIG. 1 and outputs the group information corresponding to each subcarrier to the correlation units 35-1 to 35-M.

The first determination unit 37 determines whether the input correlation values are positive or negative at every group and stores the determination result into the memory 42. The second determination unit 38 determines the number of the transmitting antennas at the time when the correlation values of the groups corresponding to the whole of the known symbols are stored into the memory 42 on the basis of the combination of the correlation values of the groups.

The second determination unit 38 stores a reference table as shown in FIG. 27, the table including the combinations of the correlation values of each group of each known symbol and the number of the transmitting antennas. The second determination unit 38 determines the number of the transmitting antennas, based on the correlation values of each group determined and input from the first determination unit 37 and the reference table, and outputs the determination result to the MIMO receiving unit 40.

The MIMO receiving unit 40 performs an MIMO signal receiving process, e.g., maximum likelihood estimation, on the data symbol section signals from the FFT units 32-1 to 32-M in accordance with the channel estimation values from the memories 39-1 to 39-M, and the estimation value of the number of transmitting antennas from the second determination unit 38. Channel decoding is performed on the signals having undergone this MIMO signal receiving process, thereby reconstructing transmitted data 41.

As description above, according to the sixth embodiment, since a plurality of known symbols are sequentially transmitted, though efficiency is decreased due to increase of the known symbols, the number of notification item (information patterns) notified to the receiver can be increased without increasing the number of groups at each known symbol.

Seventh Embodiment

Figure 28:
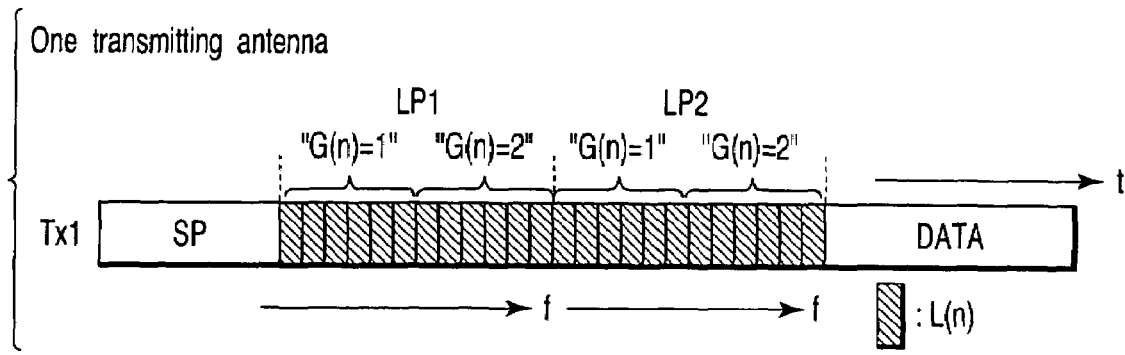
FIG. 28 is a view for explaining a known symbol transmission method, when there is one transmitting antenna, according to the seventh embodiment.
Figure 29:
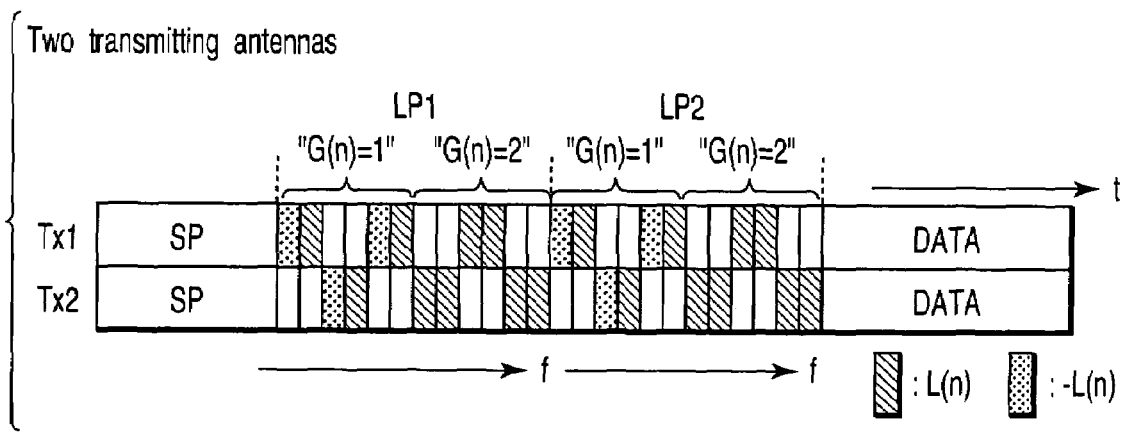
FIG. 29 is a view for explaining a known symbol transmission method, when there is two transmitting antennas, according to the seventh embodiment.
Figure 30:
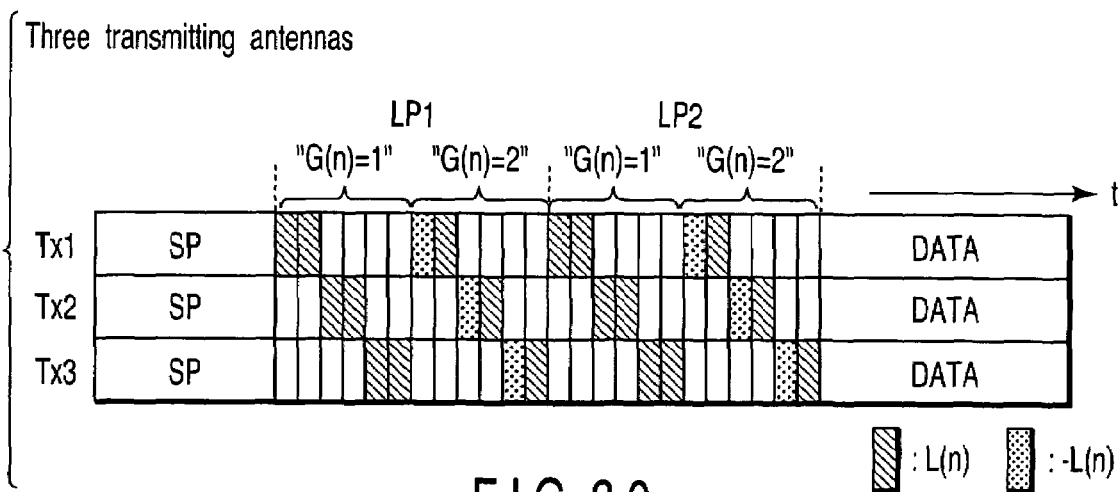
FIG. 30 is a view for explaining a known symbol transmission method, when there is three transmitting antennas, according to the seventh embodiment.

Next, a known symbol (for channel estimation) transmission method according to a seventh embodiment will be explained referring to FIG. 28-FIG. 30. Similar to the sixth embodiment, in the seventh embodiments, notification item such as the number of the transmitting antennas is notified by using a plurality of known symbols. FIGS. 28 to 30 illustrate the structures of radio frames containing preambles when there are, respectively, one (Tx1), two (Tx1, Tx2), and three (Tx1, Tx2, Tx3) transmitting antennas which simultaneously transmit known symbols.

In the case of FIG. 28 (M=1: one antenna), the combination of the numbers of subcarriers, in which known information of each known symbol transmitted from antenna 1 (Tx1) exists, group numbers of the subcarriers, and information values carried on these subcarriers are as follows.

The known symbol LP1 and LP2 of the antenna 1: subcarrier numbers (0, 1, 2, 3, 4, 5, 6, 7, 8, 9, 10, 11), group numbers (1, 1, 1, 1, 1, 1, 2, 2, 2, 2, 2, 2), information values [L1 (0), L1 (1), L1 (2), L1 (3), L1 (4), L1 (5), L1 (6), L1 (7), L1 (8), L1 (9), L1 (10), L1 (11)].

In the case of FIG. 29 (M=2: two antennas), the combination of the numbers of subcarriers, in which known information of each known symbol transmitted from antenna 1 (Tx1) and antenna 2 (Tx2) exists, group numbers of the subcarriers, and information values carried on these subcarriers are as follows.

The known symbol LP1 and LP2 of the antenna 1: subcarrier numbers (0, 1, 4, 5, 8, 9), group numbers (1, 1, 1, 1, 2, 2), information values [−L1 (0), L1 (1), −L1 (4), L1 (5), L1 (8), L1 (9)].

The known symbol LP1 and LP2 of the antenna 2: subcarrier numbers (2, 3, 6, 7, 10, 11), group numbers (1, 1, 2, 2, 2, 2), information values [−L1 (2), L1 (3), L1 (6), L1 (7), L1 (10), L1 (11)].

In the case of FIG. 30 (M=3: three antennas), the combination of the numbers of subcarriers, in which known information of each known symbol transmitted from antenna 1 (Tx1), antenna 2 (Tx2) antenna 3 (Tx3) exists, group numbers of the subcarriers, and information values carried on these subcarriers are as follows.

The known symbol LP1 and LP2 of the antenna 1: subcarrier numbers (0, 1, 6, 7), group numbers (1, 1, 2, 2), information values [L1 (0), L1 (1), −L1 (6), L1 (7)].

The known symbol LP1 and LP2 of the antenna 2: subcarrier numbers (2, 3, 8, 9), group numbers (1, 1, 2, 2), information values [L1 (2), L1 (3), −L1 (8), L1 (9)].

The known symbols LP1 and LP2 of the antenna 3: subcarrier numbers (4, 5, 10, 11), group numbers (1, 1, 2, 2), information values [L1 (4), L1 (5), −L1 (10), L1 (11)].

Note that in FIGS. 28 to 30, the preamble structure is represented with time. However, for the sake of convenience, subcarriers on which known information of the long preamble LP exists are represented by oblique lines and dots. Also, subcarriers indicated by dots represent subcarriers into which known information whose phase is inverted is inserted. The upper sections of each subcarrier, in FIGS. 28 to 30, indicate the group number to which the each subcarrier belongs.

As shown in FIG. 28-FIG. 30, the known symbols according to the seventh embodiment, inversion/non-inversion of phase of known information on one of two adjacent subcarriers is controlled at every group to which the two adjacent subcarriers belong, in accordance with notification item (for example, the number of the transmitting antennas) to be notified to the receiver, and successive identical known symbols whose subcarrier arrangements on which the plural known information are carried are the same with ease other are transmitted.

Figure 31:
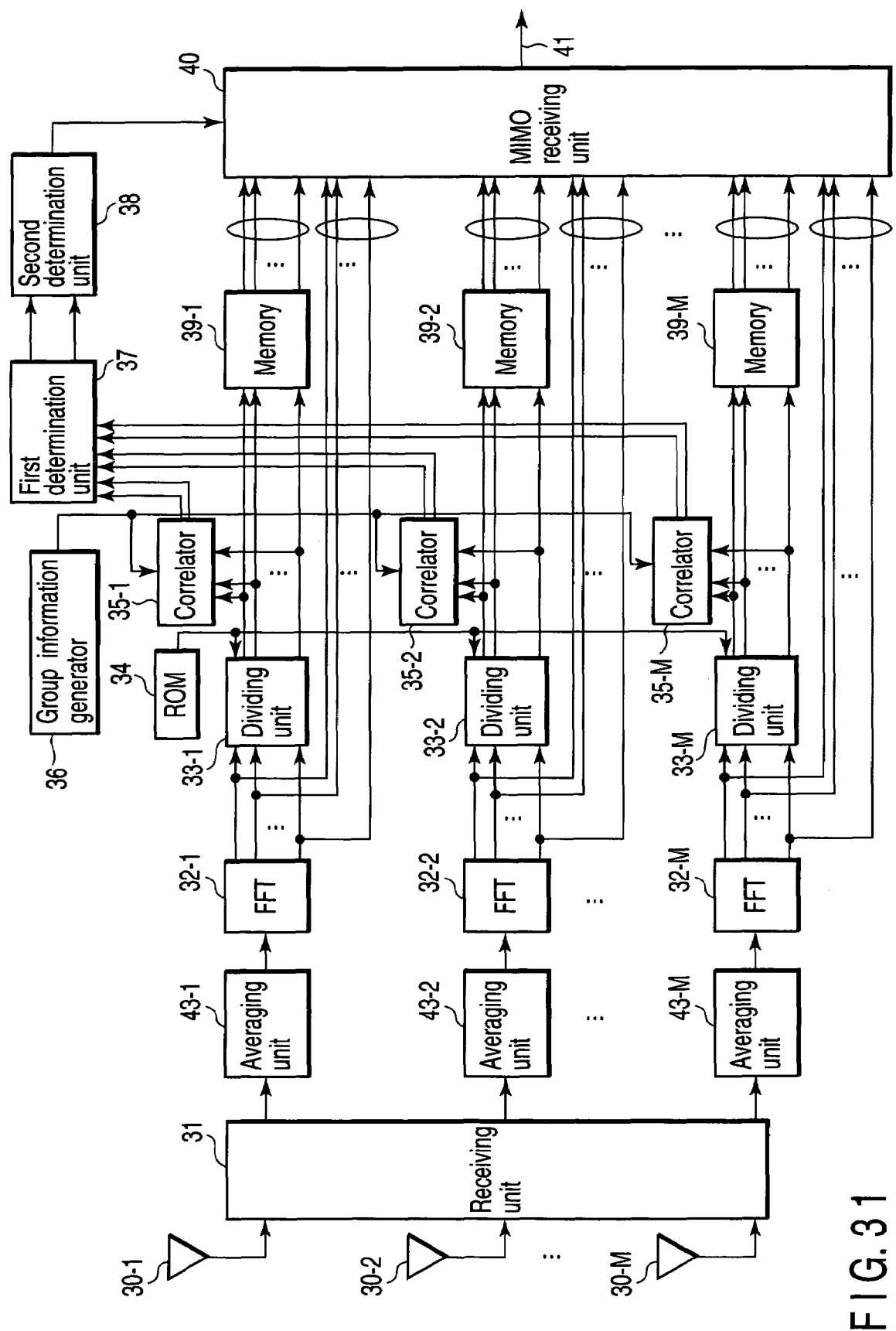
FIG. 31 is a block diagram showing the arrangement of a wireless communication apparatus (a receiver) according to the seventh embodiment.

FIG. 31 shows the example of the configuration of the receiver according to the seventh embodiment. In FIG. 31, the same parts as those of in FIG. 5 are designated by the same reference symbols. The configuration of the receiver in FIG. 31 differs from that of in FIG. 5 in the existence of an additional averaging units 43-1 to 43-M.

In FIG. 31, the plurality of receiving antennas 30-1 to 30-M receive OFDM signals in radio frequency (RF) band transmitted from the transmitter in FIG. 1. The OFDM signals received by the receiving antennas 30-1 to 30-M are input to the receiving unit 31.

In the receiving unit 31, the input OFDM signals from the receiving antennas 30-1 to 30-M are amplified by a low-noise amplifier (LNA), and converted (down-converted) into a base band by a frequency converter. In addition, these frequency-converted signals are converted into digital signals by an analog-to digital (A/D) converter, and the guard intervals (GIs) are removed from the digital signals.

Of the output signals from the receiving units 31, signals of known symbol sections are input to the averaging units 43-1 to 43-M. The averaging units 43-1 to 43-M average the known symbols input so far, to obtain average known symbol of all the known symbols input (in this case two successive known symbols). Each average known symbol output from each of the averaging unit is input to each of the FFT units 32-1 to 32-M.

Of the output signals from the receiving units 31, signals of data symbol sections are supplied to the FFT units 32-1 to 32-M by bypassing the averaging units 43-1 to 43-M.

Each of the FFT units 32-1 to 32-M transform these waveform signals in the time domain into waveform signals in the frequency domain, i.e., into the waveforms of individual subcarriers. Of the output signals from the FFT units 32-1 to 32-M, signals of data symbol sections are input to an MIMO signal processing unit 40.

On the other hand, of the output signals from the FFT units 32-1 to 32-M, signals of preambles, particularly, known symbol sections are input to dividing units 33-1 to 33-M. The waveforms of the individual subcarriers input to these dividing units are divided by a known symbol pattern stored in a ROM 34, and thereby converted into estimation values of the channel characteristics. These estimation values are stored in memories 39-1 to 39-M and input to correlators 35-1 to 35-M. The known information pattern stored in the ROM 34 is the same as in the case of FIG. 28 (when one antenna (M=1)).

The correlators 35-1 to 35-M calculate each correlation value corresponding to each group by using the channel characteristic estimation values, based on group information of subcarriers from a group information generator 36, and input the correlation value to a first determination unit 37. The group information generator 36 is composed similarly to that of the group information generator 17 in FIG. 1 and outputs the group information corresponding to each subcarrier to the correlation units 35-1 to 35-M.

The first determination unit 37 determines whether the input correlation values are positive or negative at every group and stores the determination result into the second determination unit 38. The second determination unit 38 determines the number of the transmitting antennas on the basis of the combination of the correlation values of the groups, and output the determination result (the estimation value which is the number of the transmitting antennas determined) to the MIMO receiving unit 40.

The MIMO receiving unit 40 performs an MIMO signal receiving process, e.g., maximum likelihood estimation, on the data symbol section signals from the FFT units 32-1 to 32-M in accordance with the channel estimation values from the memories 39-1 to 39-M, and the estimation value of the number of transmitting antennas from the second determination unit 38. Channel decoding is performed on the signals having undergone this MIMO signal receiving process, thereby reconstructing transmitted data 41.

As description above, according to the seventh embodiment, since a plurality of identical known symbols are sequentially transmitted, transmission efficiency is decreased due to increase of the known symbols. However, since the channel properties and the number of the transmitting antennas are estimates by using the average of the identical known symbols whose subcarrier arrangements on which plural known information are carried, as mentioned above, affection of noises can be reduced and estimation accuracy of notification item to be notified to the receiver such an the number of the transmitting antenna can be improved.

In each of the above embodiments as explained above, the receiving can easily estimate the notification item used for demodulation of data symbols, such as the number of transmitting antennas, a modulation method of modulating the data symbols, a encoding method for encoding the data symbols, the coding rate of the data symbols, the number of the data symbols, amount of information included in the data symbols, etc., and demodulate the data symbols with high accuracy.

What is claimed is:

1. A wireless communication apparatus, comprising:
a first transmitting unit configured to transmit a known symbol using a plurality of subcarriers by using a plurality of antennas, each of the subcarriers being classified into one of a plurality of groups, at least one of the groups being set to a negative correlation group and each remaining group of the groups being set to a positive correlation group according to an information pattern of a plurality of different information patterns which corresponds to an information item to be notified to a receiver side among a plurality of information items, the information patterns corresponding to the information items, respectively, each information pattern defining which group to be set to the negative correlation group and which group to be set to the positive correlation group, wherein a phase of one of two adjacent subcarriers that are transmitted by the same antenna and belong to the negative correlation group is inverted, a phase of the other of the two adjacent subcarriers is noninverted, and both phases of two adjacent subcarriers that are transmitted by the same antenna and belong to the positive correlation group are noninverted; and
a second transmitting unit configured to transmit data symbols by using the antennas after the known symbol is transmitted.

2. The apparatus according to claim 1, wherein the first transmitting unit is configured to transmit the known symbol such that the information item is used for demodulating the data symbols on the receiver side.

3. The apparatus according to claim 1, wherein the first transmitting unit is configured to transmit the known symbol such that information item is the number of antennas used for transmitting the data symbols.

4. The apparatus according to claim 1, wherein the first transmitting unit is configured to transmit the known symbol such that the information item indicates a modulation method.

5. The apparatus according to claim 1, wherein the first transmitting unit is configured to transmit the known symbol such that the information item indicates an encoding method.

6. The apparatus according to claim 1, wherein the first transmitting unit is configured to transmit the known symbol such that the information item is a code rate of the data symbols.

7. The apparatus according to claim 1, wherein the first transmitting unit is configured to transmit the known symbol such that the information item is the number of data symbols.

8. The apparatus according to claim 1, wherein the first transmitting unit is configured to transmit the known symbol such that the information item is the amount of information included in the data symbols.

9. The apparatus according to claim 1, wherein the first transmitting unit is configured to transmit subsequently to the known symbol, by using the antennas, another known symbol that is identical to the known symbol.

10. The apparatus according to claim 1, wherein the first transmitting unit comprises:
a memory configured to store a plurality of known symbol patterns having different subcarrier arrangements on which plural known information are carried;
a timing generating unit configured to generate a timing signal indicating a timing at which the known symbol is to be transmitted;
a selector configured to select a known symbol pattern to be used in the known symbol from the known symbol patterns in accordance with the timing signal; and
a phase control unit configured to control inversion/non-inversion of the phase of the two adjacent subcarriers that are transmitted by the same antenna and belong to the same group in accordance with the group and the information item to be notified to the receiver side.

11. The apparatus according to claim 1, wherein the number of the groups is defined based on the number of information items to be notified to the receiver side.

12. A wireless communication apparatus, comprising:
a receiving unit configured to receive a known symbol and subsequent data symbols transmitted by a plurality of antennas, the known symbol including a plurality of subcarriers, each of the subcarriers being classified into one of a plurality of groups, at least one of the groups being set to a negative correlation group and each remaining group of the groups being set to a positive correlation group according to an information pattern which corresponds to an information item used for demodulating the data symbols, the information pattern defining which group to be set to the negative correlation group and which group to be set to the positive correlation group, wherein a phase of one of two adjacent subcarriers that are transmitted by the same antenna and belong to the negative correlation group is inverted, a phase of the other of the two adjacent subcarriers is noninverted, and both phases of two adjacent subcarriers that are transmitted by the same antenna and belong to the positive correlation group are noninverted;
a first calculating unit configured to calculate each channel estimation value corresponding to each of the subcarriers, from the known symbol received;
a second calculating unit configured to calculate a correlation value between two channel estimation values corresponding to the two adjacent subcarriers that are received by the same antenna and belong to the same group, to obtain each correlation value corresponding to each of the groups;
an estimating unit configured to estimate the information item based on which group is the negative correlation group whose correlation value is negative and which group is the positive correlation group whose correlation value is positive.

13. The apparatus according to claim 12, wherein the receiving unit is configured to receive subsequently to the known symbol, by using the antennas, another known symbol that is identical to the known symbol; and
the first calculating unit includes an averaging unit configured to average waveforms in the frequency domain corresponding to the known symbol and the another known symbol, to obtain a waveform averaged, and to calculate each channel estimation value from the waveform averaged.

* * * * *